(12) United States Patent
Spencer et al.

(10) Patent No.: US 11,652,287 B2
(45) Date of Patent: May 16, 2023

(54) ANTENNA SYSTEMS FOR WIRELESS COMMUNICATION IN LUMINAIRES

(71) Applicant: ABL IP Holding LLC, Atlanta, GA (US)

(72) Inventors: Charles Jeffrey Spencer, Wilmette, IL (US); Towfiq M. Chowdhury, Lake Forest, IL (US); Mohammad Bani Hani, Glenview, IL (US); Daniel Francis Posacki, Wheaton, IL (US); Kyle Michael Bradd, Park Ridge, IL (US)

(73) Assignee: ABL IP HOLDING LLC, Atlanta, GA (US)

( * ) Notice: Subject to any disclaimer, the term of this patent is extended or adjusted under 35 U.S.C. 154(b) by 817 days.

(21) Appl. No.: 16/659,336

(22) Filed: Oct. 21, 2019

(65) Prior Publication Data

US 2020/0127374 A1 Apr. 23, 2020

Related U.S. Application Data

(60) Provisional application No. 62/748,248, filed on Oct. 19, 2018, provisional application No. 62/748,253, (Continued)

(51) Int. Cl.
*H01Q 1/44* (2006.01)
*H01Q 1/00* (2006.01)
(Continued)

(52) U.S. Cl.
CPC .................. *H01Q 1/44* (2013.01); *F21S 8/02* (2013.01); *F21S 8/026* (2013.01);
(Continued)

(58) Field of Classification Search
CPC ............ H01Q 1/44; H01Q 5/30; H01Q 1/007; H01Q 9/0421; H01Q 1/00; H01Q 9/04;
(Continued)

(56) References Cited

U.S. PATENT DOCUMENTS

| 4,346,640 A | 8/1982 | Zeno et al. |
| 5,424,859 A | 6/1995 | Uehara et al. |

(Continued)

FOREIGN PATENT DOCUMENTS

| CA | 3071829 | 2/2019 |
| CN | 202735830 | 2/2013 |

(Continued)

OTHER PUBLICATIONS

U.S. Appl. No. 16/659,348, Non-Final Office Action, dated Aug. 20, 2021, 12 pages.

(Continued)

*Primary Examiner* — Hai V Tran
(74) *Attorney, Agent, or Firm* — Kilpatrick Townsend & Stocton LLP

(57) ABSTRACT

A luminaire includes a light source positioned at a first level within a luminaire housing. The luminaire also includes a trim component positioned at a second level of the luminaire housing different from the first level. The trim component extends into a room from a ceiling surface and includes an aperture antenna that receives wireless signals and transmits wireless signals. Further, the luminaire includes a communication module that communicates wirelessly with one or more devices remote from the luminaire by controlling excitation of the aperture antenna.

18 Claims, 17 Drawing Sheets

Related U.S. Application Data filed on Oct. 19, 2018, provisional application No. 62/748,268, filed on Oct. 19, 2018, provisional application No. 62/748,283, filed on Oct. 19, 2018, provisional application No. 62/802,271, filed on Feb. 7, 2019.

(51) Int. Cl.

| | | |
|---|---|---|
| *H01Q 5/30* | (2015.01) | |
| *H01Q 9/04* | (2006.01) | |
| *F21S 8/02* | (2006.01) | |
| *F21V 23/04* | (2006.01) | |
| *H05B 47/12* | (2020.01) | |
| *H05B 47/19* | (2020.01) | |

(52) U.S. Cl.
CPC .......... *F21V 23/0435* (2013.01); *H01Q 1/00* (2013.01); *H01Q 1/007* (2013.01); *H01Q 5/30* (2015.01); *H01Q 9/04* (2013.01); *H01Q 9/0421* (2013.01); *H05B 47/12* (2020.01); *H05B 47/19* (2020.01)

(58) Field of Classification Search
CPC ..... H05B 47/19; H05B 47/12; F21V 23/0435; F21V 23/04; F21S 8/026; F21S 8/02
USPC ........................................................ 343/721
See application file for complete search history.

(56) References Cited

U.S. PATENT DOCUMENTS

| | | |
|---|---|---|
| 6,000,493 A | 12/1999 | Chen |
| 6,343,135 B1 | 1/2002 | Ellero et al. |
| 6,528,954 B1 | 3/2003 | Lys et al. |
| 6,548,967 B1 | 4/2003 | Dowling et al. |
| 6,748,096 B2 | 6/2004 | Chuang |
| 7,162,258 B2 | 1/2007 | Beach et al. |
| 7,446,671 B2 | 11/2008 | Giannopoulos et al. |
| 7,741,782 B2 | 6/2010 | Vermeulen et al. |
| 7,976,048 B2 | 7/2011 | Bartolome et al. |
| 8,033,686 B2 | 10/2011 | Recker et al. |
| 8,251,544 B2 | 8/2012 | Ivey et al. |
| 8,282,227 B2 | 10/2012 | Massara et al. |
| 8,445,826 B2 | 5/2013 | Verfuerth |
| 8,476,565 B2 | 7/2013 | Verfuerth |
| 8,586,902 B2 | 11/2013 | Verfuerth |
| 8,628,216 B2 | 1/2014 | Ivey et al. |
| 8,675,887 B2 | 3/2014 | Yuan et al. |
| 8,731,689 B2 | 5/2014 | Plainer et al. |
| 8,829,821 B2 | 9/2014 | Chobot et al. |
| 8,912,735 B2 | 12/2014 | Chobot et al. |
| 8,981,646 B2 | 3/2015 | Kim |
| 9,053,622 B2 | 6/2015 | Scalisi |
| 9,081,269 B2 | 7/2015 | Conti |
| 9,115,886 B2 | 8/2015 | Lam et al. |
| 9,143,230 B2 | 9/2015 | Casaccia et al. |
| 9,143,741 B1 | 9/2015 | Fu et al. |
| 9,161,111 B2 | 10/2015 | Yuan et al. |
| 9,163,816 B2 | 10/2015 | Baschnagel |
| 9,172,917 B1 | 10/2015 | Fu et al. |
| 9,267,675 B2 | 2/2016 | Wu |
| 9,294,828 B2 | 3/2016 | Rutherford |
| 9,303,863 B2 | 4/2016 | Vaidya |
| 9,313,575 B2 | 4/2016 | Wang et al. |
| 9,320,101 B2 | 4/2016 | Sun et al. |
| 9,328,913 B2 | 5/2016 | Yotsumoto et al. |
| 9,353,939 B2 | 5/2016 | Simon et al. |
| 9,433,061 B2 | 8/2016 | Chobot |
| 9,438,976 B2 | 9/2016 | Wang et al. |
| 9,441,634 B2 | 9/2016 | Spiro |
| 9,532,438 B2 | 12/2016 | Leung et al. |
| 9,554,089 B2 | 1/2017 | Tang et al. |
| 9,561,449 B2 | 2/2017 | Wang et al. |
| 9,568,184 B2 | 2/2017 | Kasuga |
| 9,572,226 B2 | 2/2017 | Motley et al. |
| 9,574,763 B2 | 2/2017 | Chen |
| 9,596,716 B2 | 3/2017 | Deng et al. |
| 9,602,787 B2 | 3/2017 | Blaser, Jr. et al. |
| 9,635,740 B2 | 4/2017 | Sun et al. |
| 9,642,221 B2 | 5/2017 | Schlangen |
| 9,642,222 B2 | 5/2017 | Fathollahi et al. |
| 9,651,243 B1 | 5/2017 | Springer |
| 9,654,678 B1 | 5/2017 | Fu et al. |
| 9,655,216 B2 | 5/2017 | Murakami et al. |
| 9,668,053 B1 | 5/2017 | Rivera et al. |
| 9,713,228 B2 | 7/2017 | Reed |
| 9,717,132 B2 | 7/2017 | Sun et al. |
| 9,726,360 B1 | 8/2017 | Alexander et al. |
| 9,739,472 B1 | 8/2017 | Li |
| 9,746,138 B2 | 8/2017 | Thomas |
| 9,750,118 B2 | 8/2017 | Yotsumoto et al. |
| 9,759,421 B1 | 9/2017 | Baschnagel |
| 9,765,959 B2 | 9/2017 | Yim et al. |
| 9,784,417 B1 | 10/2017 | Springer |
| 9,794,690 B2 | 10/2017 | Wang et al. |
| 9,800,429 B2 | 10/2017 | Crayford et al. |
| 9,805,575 B2 | 10/2017 | Sun et al. |
| 9,807,506 B2 | 10/2017 | Wang et al. |
| 9,820,024 B1 | 11/2017 | Rolf |
| 9,822,963 B2 | 11/2017 | Wang et al. |
| 9,826,298 B2 | 11/2017 | Sun et al. |
| 9,838,652 B2 | 12/2017 | Chien |
| 9,848,265 B2 | 12/2017 | Wen et al. |
| 9,851,092 B2 | 12/2017 | Yotsumoto et al. |
| 9,874,334 B2 | 1/2018 | Chen |
| 9,939,143 B2 | 4/2018 | Spiro |
| 9,955,541 B2 | 4/2018 | Dowling et al. |
| 9,958,149 B2 | 5/2018 | You et al. |
| 10,009,982 B2 | 6/2018 | Ben-Moshe et al. |
| 10,034,356 B2 | 7/2018 | Sun et al. |
| 10,098,211 B2 | 10/2018 | Recker et al. |
| 10,111,296 B2 | 10/2018 | Wu et al. |
| 10,139,099 B2 | 11/2018 | Ivey et al. |
| 2004/0175014 A1 | 9/2004 | Liu |
| 2005/0200556 A1* | 9/2005 | Lin ................. H01Q 5/364 343/904 |
| 2007/0086724 A1 | 4/2007 | Grady et al. |
| 2007/0222631 A1 | 9/2007 | Haase |
| 2007/0223770 A1 | 9/2007 | Fujisawa et al. |
| 2008/0143495 A1 | 6/2008 | Haase |
| 2009/0136076 A1 | 5/2009 | Chi |
| 2011/0062888 A1 | 3/2011 | Bondy et al. |
| 2011/0121654 A1 | 5/2011 | Recker et al. |
| 2011/0260652 A1 | 10/2011 | Hsieh |
| 2011/0317846 A1 | 12/2011 | Yuan et al. |
| 2012/0206050 A1 | 8/2012 | Spero |
| 2012/0218978 A1 | 8/2012 | Ishidoshiro |
| 2012/0320588 A1 | 12/2012 | Quilici et al. |
| 2013/0049633 A1 | 2/2013 | Wann et al. |
| 2013/0308315 A1 | 11/2013 | Capitani et al. |
| 2013/0320861 A1 | 12/2013 | Sinai et al. |
| 2014/0118120 A1 | 5/2014 | Chen et al. |
| 2014/0270264 A1 | 9/2014 | Wang et al. |
| 2014/0285113 A1 | 9/2014 | Huang |
| 2014/0286011 A1 | 9/2014 | Luna et al. |
| 2014/0286517 A1 | 9/2014 | Luna et al. |
| 2014/0300293 A1 | 10/2014 | Ruan et al. |
| 2014/0328484 A1 | 11/2014 | Molinie et al. |
| 2014/0354160 A1 | 12/2014 | Aggarwal et al. |
| 2015/0043426 A1 | 2/2015 | Aggarwal et al. |
| 2015/0084518 A1 | 3/2015 | Takahashi |
| 2015/0130355 A1 | 5/2015 | Rains, Jr. et al. |
| 2015/0153037 A1 | 6/2015 | Lee |
| 2015/0312394 A1 | 10/2015 | Mirza et al. |
| 2016/0050493 A1 | 2/2016 | Wang et al. |
| 2016/0061438 A1 | 3/2016 | Lu |
| 2016/0072176 A1* | 3/2016 | Van Dijk ............. F21V 29/70 343/721 |
| 2016/0128154 A1 | 5/2016 | Barnetson et al. |
| 2016/0128167 A1 | 5/2016 | Sun et al. |
| 2016/0135271 A1 | 5/2016 | Alexander |
| 2016/0154171 A1 | 6/2016 | Kato et al. |
| 2016/0198542 A1 | 7/2016 | Chiang |

(56) References Cited

U.S. PATENT DOCUMENTS

| | | |
|---|---|---|
| 2016/0198547 A1 | 7/2016 | Pan et al. |
| 2016/0205362 A1 | 7/2016 | Tang et al. |
| 2016/0205477 A1 | 7/2016 | Kuribayashi et al. |
| 2016/0215933 A1 | 7/2016 | Skelton et al. |
| 2016/0227633 A1 | 8/2016 | Sun et al. |
| 2016/0230982 A1 | 8/2016 | Simon et al. |
| 2016/0234414 A1 | 8/2016 | Chen |
| 2016/0261824 A1 | 9/2016 | Scalisi |
| 2016/0270148 A1 | 9/2016 | Filipovic et al. |
| 2016/0284176 A1 | 9/2016 | Harrington et al. |
| 2016/0295668 A1 | 10/2016 | Saijo |
| 2017/0187154 A1 | 6/2017 | Skelton et al. |
| 2017/0237471 A1 | 8/2017 | Green et al. |
| 2017/0238397 A1 | 8/2017 | Green et al. |
| 2017/0238400 A1 | 8/2017 | Fathollahi et al. |
| 2017/0244148 A1 | 8/2017 | Ge et al. |
| 2017/0295629 A1 | 10/2017 | Chiu et al. |
| 2017/0311062 A1 | 10/2017 | Garrett et al. |
| 2017/0366886 A1 | 12/2017 | Bernier |
| 2018/0050634 A1 | 2/2018 | White et al. |
| 2018/0051872 A1 | 2/2018 | Ivey et al. |
| 2018/0063659 A1 | 3/2018 | Pan |
| 2018/0077779 A1 | 3/2018 | Johnson |
| 2018/0077781 A1 | 3/2018 | McCanless et al. |
| 2018/0132337 A1* | 5/2018 | Honda ............... H05B 47/115 |
| 2018/0235060 A1* | 8/2018 | Vendetti ............... H04W 84/18 |
| 2018/0356089 A1 | 12/2018 | Zhang et al. |
| 2019/0014650 A1* | 1/2019 | Schroeder ............ H01Q 1/2208 |
| 2019/0027099 A1* | 1/2019 | Kumar ............... F21V 23/045 |
| 2019/0041050 A1 | 2/2019 | Cairns et al. |
| 2019/0075634 A1 | 3/2019 | Cho et al. |
| 2019/0301727 A1 | 10/2019 | Sieczkowski |
| 2019/0394547 A1 | 12/2019 | Lemons et al. |
| 2021/0280967 A1 | 9/2021 | Wu et al. |

FOREIGN PATENT DOCUMENTS

| | | |
|---|---|---|
| CN | 203193950 | 9/2013 |
| CN | 103809548 | 5/2014 |
| CN | 203605159 | 5/2014 |
| CN | 103899963 | 7/2014 |
| CN | 203801112 | 8/2014 |
| CN | 104020733 | 9/2014 |
| CN | 104378886 | 2/2015 |
| CN | 204231709 | 3/2015 |
| CN | 204442783 | 7/2015 |
| CN | 107250930 | 10/2017 |
| EP | 2506686 | 10/2012 |
| EP | 3036594 | 6/2016 |
| GB | 2544543 | 5/2017 |
| KR | 101641510 | 7/2016 |
| KR | 20160100656 | 8/2016 |
| WO | 2011125845 | 10/2011 |
| WO | 2014084413 | 6/2014 |
| WO | 2014160096 | 10/2014 |
| WO | 2014186040 | 11/2014 |
| WO | 2016052956 | 4/2016 |
| WO | 2016066564 | 5/2016 |
| WO | 2017043671 | 3/2017 |
| WO | 2017062776 | 4/2017 |
| WO | 2017157120 | 9/2017 |
| WO | 2017193781 | 11/2017 |
| WO | 2017215406 | 12/2017 |

OTHER PUBLICATIONS

U.S. Appl. No. 16/659,348, Notice of Allowance, dated Nov. 12, 2021, 7 pages.
Application No. CA 3,059,289, Office Action, dated Oct. 27, 2021, 3 pages.
Application No. CA 3,059,292, Office Action, dated Oct. 27, 2021, 3 pages.
Sung et al., Design and Implementation of a Smart LED Lighting System Using a Self Adaptive Weighted Data Fusion Algorithm, Sensors, vol. 13, No. 12, Dec. 2013, 25 pages.
U.S. Appl. No. 16/659,348, Final Office Action dated May 7, 2021, 12 pages.
Canadian Application No. CA 3,059,316, Office Action dated May 17, 2021, 3 pages.
U.S. Appl. No. 16/659,341, Non-Final Office Action, dated Feb. 3, 2021, 15 pages.
U.S. Appl. No. 16/659,344, Non-Final Office Action, dated Feb. 19, 2021, 25 pages.
Application No. CA 3,059,289, Office Action, dated Dec. 11, 2020, 3 pages.
Application No. CA 3,059,292, Office Action, dated Nov. 26, 2020, 4 pages.
Application No. CA 3,059,316, Office Action, dated Nov. 27, 2020, 5 pages.
U.S. Appl. No. 16/659,341, Final Office Action, dated Oct. 6, 2020, 15 pages.
U.S. Appl. No. 16/659,348, Non-Final Office Action, dated Dec. 4, 2020, 11 pages.
"Gasket", Wikipedia, Available online at: https://en.wikipedia.org/wiki/Gasket, May 1, 2020, 7 pages.
U.S. Appl. No. 16/659,341, Non-Final Office Action, dated May 7, 2020, 14 pages.

\* cited by examiner

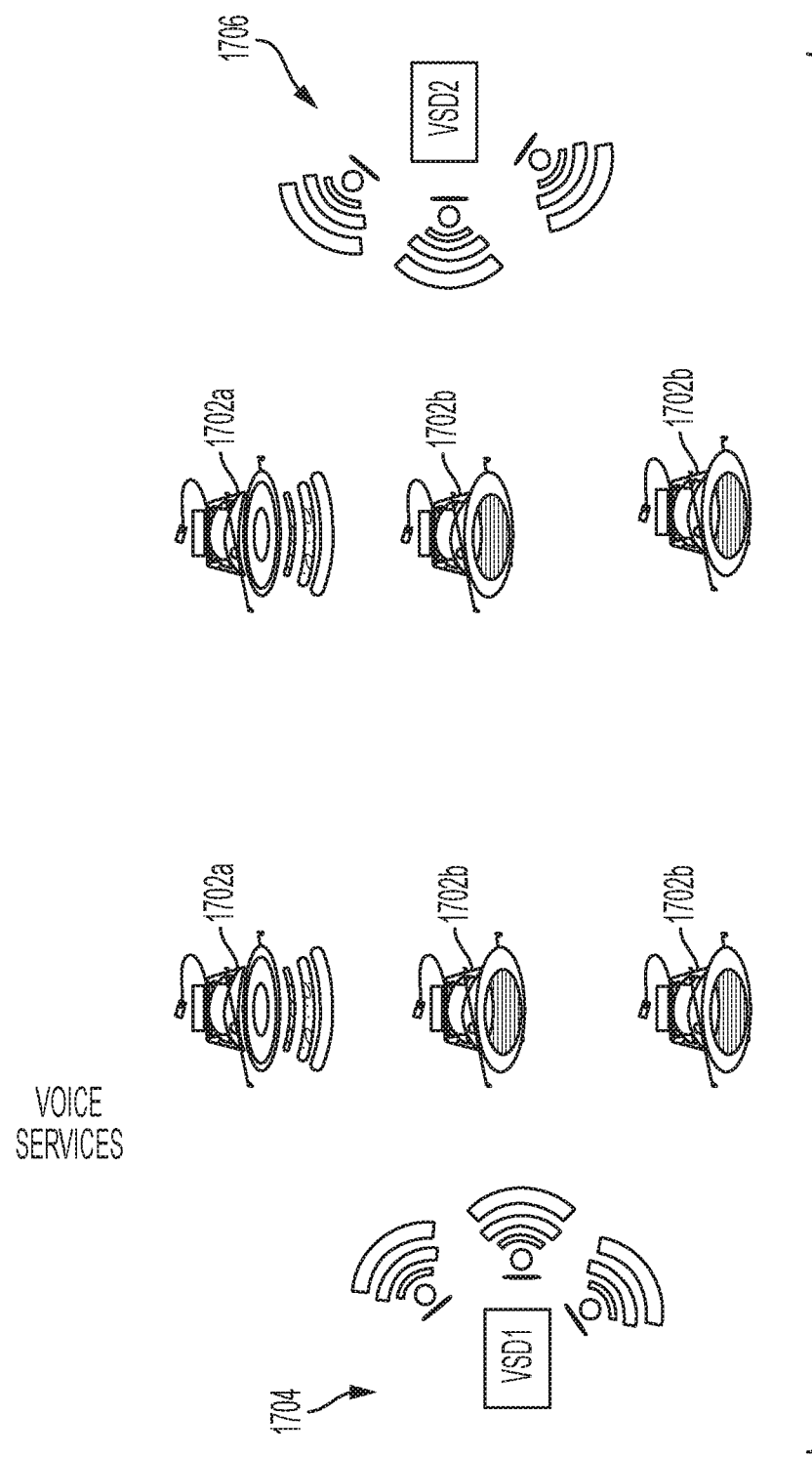

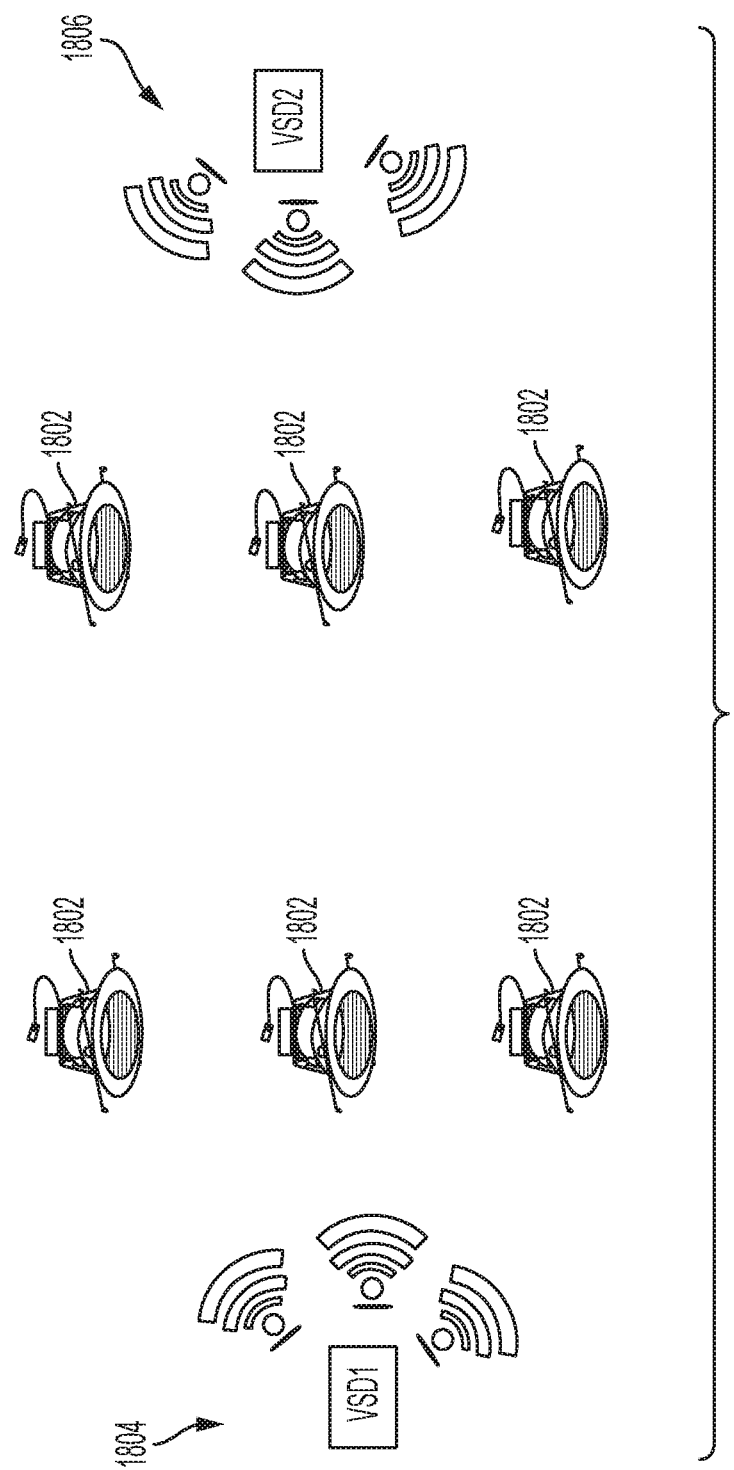

ANTENNA SYSTEMS FOR WIRELESS COMMUNICATION IN LUMINAIRES

CROSS-REFERENCE TO RELATED APPLICATIONS

This disclosure claims priority to U.S. Provisional Application No. 62/748,248 entitled "Component Integration of Elements Associated with a Luminaire," filed Oct. 19, 2018, to U.S. Provisional Application No. 62/748,253 entitled "Light Fixtures with Integrated Speakers," filed Oct. 19, 2018, to U.S. Provisional Application No. 62/748,268 entitled "Light Fixtures with User Experience Capabilities," filed Oct. 19, 2018, to U.S. Provisional Application No. 62/748,283 entitled "Light Fixtures with Virtual Assistant Functionality," filed Oct. 19, 2018, and to U.S. Provisional Application No. 62/802,271 entitled "Inverted F Antenna and Slot Antenna Systems for a Luminaire," filed Feb. 7, 2019, the entireties of which are hereby incorporated by reference herein.

TECHNICAL FIELD

This disclosure relates generally to systems to control luminaire operations. More specifically, but not by way of limitation, this disclosure relates to systems that enable control of luminaire operations using interactive user interfaces.

BACKGROUND

Connected lighting can include lamps, luminaires, and controls that communicate through technologies such as WiFi, Bluetooth, or any other communication protocols to provide an increased level of control of the lamps, luminaire, and controls. The connected lighting may be controlled with smartphone applications, web portals, voice-activated devices, other control mechanisms, or any combination thereof. The implementation of connected lighting using one or more wireless communication schemes relies on the addition of one or more antennas to a luminaire that is capable of receiving and transmitting wireless signals.

In some examples, the luminaire operating as part of a connected lighting system may suffer from a lack of antenna arrangements that provide adequate connectivity to wireless signals. For example, designing a dual-band antenna for integration of WiFi and Bluetooth into a chassis of a luminaire that is installed within a metallic ceiling can may provide challenges. Such a dual-band antenna may be susceptible to mismatch or detuning when integrated into a smart home luminaire that is installed in a metallic recessed can. The antenna radio frequency performance may shift and become detuned upon insertion of the fixture into the recessed light can.

SUMMARY

Certain aspects involve connected lighting systems including antennas that enable control of luminaire operations using interactive user interfaces. For instance, a luminaire includes a light source positioned at a first level within a luminaire housing. The luminaire also includes a trim component positioned at a second level of the luminaire housing different from the first level. The trim component extends into a room from a ceiling surface and includes an aperture antenna that receives wireless signals and transmits wireless signals. Further, the luminaire includes a communication module that communicates wirelessly with one or more devices remote from the luminaire by controlling excitation of the aperture antenna.

In another example, lighting system includes a first luminaire and a second luminaire. The first luminaire includes a first light source positioned at a first level within a first luminaire housing. The first luminaire also includes a first trim component positioned at a second level within the first luminaire housing where the second level is different from the first level. The trim component includes a first aperture antenna that receives wireless signals and transmits wireless signals. Further, the first luminaire includes a first communication module that communicates wirelessly with one or more devices remote from the luminaire by controlling excitation of the first aperture antenna. The second luminaire of the lighting system is capable of communicating wirelessly with the first luminaire across the first aperture antenna of the first luminaire.

In another example, a luminaire includes a light source that illuminates an area surrounding the luminaire. The luminaire also includes a trim component including an aperture antenna that is able to receive wireless signals and to transmit wireless signals. The aperture antenna includes a first edge a second edge opposite the first edge. The luminaire also includes a coaxial cable that provides an alternating current (AC) voltage source to the aperture antenna. The coaxial cable includes a first conductor coupled to the first edge of the aperture antenna and a second conductor coupled to the second edge of the aperture antenna. Further, the luminaire includes a communication module that communicates wirelessly with one or more devices remote from the luminaire by controlling excitation of the aperture antenna using the coaxial cable These illustrative aspects are mentioned not to limit or define the disclosure, but to provide examples to aid understanding thereof. Additional aspects are discussed in the Detailed Description, and further description is provided there.

BRIEF DESCRIPTION OF THE DRAWINGS

Features, aspects, and advantages of the present disclosure are better understood when the following Detailed Description is read with reference to the accompanying drawings.

FIG. 17 depicts a diagram of a group of compatible connected fixtures interacting with multiple different voice services, according to certain aspects of the present disclosure.

FIG. 18 depicts a diagram of an additional group of compatible connected fixtures interacting with multiple different voice services, according to certain aspects of the present disclosure.

DETAILED DESCRIPTION

The present disclosure relates to systems that that enable control of luminaire operations using interactive user interfaces. As explained above, antennas used for wireless communication in certain types of luminaires may suffer from signal interference based on a location of the antenna within the luminaire or the arrangement of the luminaire within another body (e.g., a ceiling of a room). As a result, wireless communication between a luminaire and other devices may be limited in range or signal quality.

The presently disclosed antenna system addresses these issues by mounting the antenna system at the edge of the trim of the luminaire such that the effect of the metallic can in which the luminaire is mounted is minimal. The antenna systems may include, for example, antenna apertures that are cut out of metallic trim pieces of the luminaire. The antenna systems also include voltage sources that provide energizing voltages to sides of the antenna apertures to excite the antenna apertures. When excited, the antenna apertures may radiate radio frequency energy. The radiating radio frequency energy may operate similarly to half-wave dipole antennas.

Figure 1:
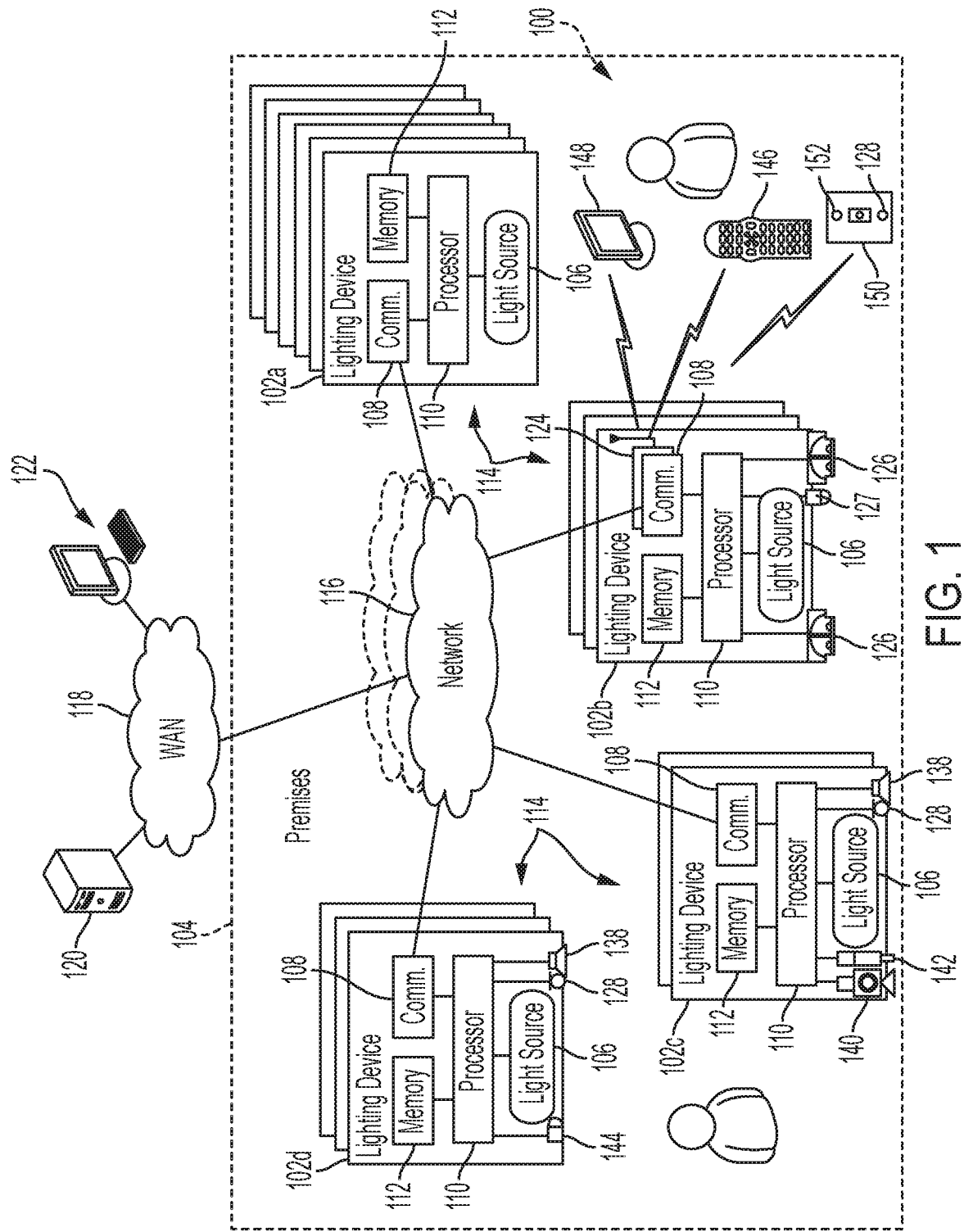
FIG. 1 depicts a block diagram of a light system including intelligent luminaires, according to certain aspects of the present disclosure.

FIG. 1 is a block diagram depicting a light system 100. The illustrated light system 100 includes a number of intelligent luminaires 102, such as recessed lights, pendant lights, fluorescent fixtures, lamps, etc. The intelligent luminaires 102 are represented in several different configurations. In another example, the intelligent luminaires 102 may all include the same configuration. Additionally, one or more of the intelligent luminaires 102 may be replaced by other connected devices (i.e., devices that are controllable through wired or wireless communication by other devices).

The intelligent luminaires 102 illuminate a service area to a level useful for a human in or passing through a space. One or more of the intelligent luminaires 102 in or on a premises 104 served by the light system 100 may have other lighting purposes, such as signage for an entrance to the premises 104 or to indicate an exit from the premises 104. The intelligent luminaires may also be configured for any other lighting or non-lighting purposes.

In an example, each of the intelligent luminaires 102 include a light source 106, a communication interface 108, and a processor 110 coupled to control the light source 106. The light sources 106 may be any type of light source suitable for providing illumination that may be electronically controlled. The light sources 106 may all be of the same type (e.g., all formed by some combination of light emitting diodes), or the light sources may have different types of light sources 106.

The processor 110 is coupled to communicate using the communication interface 108 and a network link with one or more others of the intelligent luminaires 102 and is able to control operations of at least the respective intelligent luminaire 102. The processor 110 may be implemented using hardwired logic circuitry, but in an example, the processor 110 may also be a programmable processor such as a central processing unit (CPU) of a microcontroller or a microprocessor. In the example of FIG. 1, each intelligent luminaire 102 also includes a memory 112, which stores programming for execution by the processor 110 and data that is available to be processed or has been processed by the processor 110. The processors 110 and memories 112 in the intelligent luminaires 102 may be substantially the same throughout the devices 114 throughout the premises 104, or different devices 114 may have different processors 110, different amounts of memory 112, or both depending on differences in intended or expected processing needs.

In an example, the intelligence (e.g., the processor 110 and the memory 112) and the communications interface(s) 108 are shown as integrated with the other elements of the intelligent luminaire 102 or attached to the fixture or other element that incorporates the light source 106. However, for some installations, the light source 106 may be attached in such a way that there is some separation between the fixture or other element that incorporates the electronic components that provide the intelligence and communication capabilities. For example, the communication interface(s) 108 and possibly the processor 110 and the memory 112 may be elements of a separate device or component that is coupled or collocated with the light source 106.

The light system 100 is installed at the premises 104. The light system 100 may include a data communication network 116 that interconnects the links to and from the communication interfaces 108 of the intelligent luminaires 102. In an example, interconnecting the intelligent luminaires 102 across the data communication network 116 may provide data communications amongst the intelligent luminaires 102. Such a data communication network 116 may also provide data communications for at least some of the intelligent luminaires 102 via a data network 118 outside the premises, shown by way of example as a wide area network (WAN), so as to allow the intelligent luminaires 102 or other connected devices at the premises 104 to communicate with outside devices such as a server or host computer 120 or a user terminal device 122. The wide area network 118 outside the premises 104 may be an intranet or the Internet, for example.

The intelligent luminaires 102, as well as any other equipment of the light system 100 or that uses the communication network 116 in a service area of the premises 104, connect together with and through the network links and any other media forming the communication network 116. For lighting operations, the intelligent luminaires 102 (and other system elements) for a given service area are coupled together for network communication with each other through data communication media to form a portion of a physical data communication network. Similar elements in other service areas of the premises are coupled together for network communication with each other through data communication media to form one or more other portions of the physical data communication network at the premises 104. The communication interface 108 in each intelligent luminaire 102 in a particular service area may be of a physical type and operate in a manner that is compatible with the physical media and electrical protocols implemented for the particular service area or throughout the premises 104. Although the communication interfaces 108 are shown communicating to and from the communication network 116 using lines, such as wired links or optical fibers, some or all of the communication interfaces 108 may use wireless communications media such as optical or radio frequency wireless communication.

Various network links within a service area, amongst devices in different areas or to wider portions of the communication network 116 may utilize any convenient data communication media, such as power line wiring, separate wiring such as coaxial or Ethernet cable, optical fiber, free-space optical, or radio frequency wireless (e.g., Bluetooth or WiFi). The communication network 116 may utilize combinations of available networking technologies. Some or all of the network communication media may be used by or made available for communications of other gear, equipment, or systems within the premises 104. For example, if combinations of WiFi and wired or fiber Ethernet are used for the lighting system communications, the WiFi and Ethernet may also support communications for various computer and/or user terminal devices that the occupant(s) may want to use in the premises 104. The data communications media may be installed at the time as part of installation of the light system 100 at the premises 104 or may already be present from an earlier data communication installation. Depending on the size of the communication network 116 and the number of devices and other equipment expected to use the communication network 116 over the service life of the communication network 116, the communication network 116 may also include one or more packet switches, routers, gateways, etc.

In addition to the communication interface 108 for enabling a lighting device to communicate via the communication network 116, some of the devices 11 may include an additional communication interface, shown as a wireless interface 124 in the intelligent luminaire 102b. The additional wireless interface 124 allows other elements or equipment to access the communication capabilities of the light system 100, for example, as an alternative user interface access or for access through the light system 100 to the WAN 118. In an example, the wireless interface 124 may communicate wirelessly with other devices through slot antennas or inverted F antennas (i.e., aperture antennas, generally) positioned on a trim component of the intelligent luminaire 102b, as described below with respect to FIGS. 2-12.

The host computer or server 120 can be any suitable network-connected computer, tablet, mobile device or the like programmed to implement desired network-side functionalities. Such a device may have any appropriate data communication interface to link to the WAN 118. Alternatively or in addition, the host computer or server 120 may be operated at the premises 104 and utilize the same networking media that implements the data communication network 116.

The user terminal device 122 may be implemented with any suitable processing device that can communicate and offer a suitable user interface. The user terminal device 122, for example, is shown as a desktop computer with a wired link into the WAN 118. Other terminal types, such as laptop computers, notebook computers, netbook computers, and smartphones may serve as the user terminal device 122. Also, although shown as communicating via a wired link from the WAN 118, such a user terminal device may also or alternatively use wireless or optical media, and such a device may be operated at the premises 104 and utilize the same networking media that implements the data communication network 116.

The external elements, represented generally by the server or host computer 120 and the user terminal device 122, which may communicate with the intelligent luminaires 102 of the system 100 at the premises 104, may be used by various entities or for various purposes in relation to operation of the light system 100 or to provide information or other services to users within the premises 104.

In the example of the light system 100, at least one of the intelligent luminaires 102 may include a user input sensor capable of detecting user activity related to user inputs without requiring physical contact of the user. Further, at least one of the intelligent luminaires 102 may include an output component that provides information output to the user.

Some of the intelligent luminaires 102 may not have user interface related elements. In the example of the light system 100, each of the intelligent luminaires 102a includes a light source 106, a communication interface 108 linked to the communication network 116, and a processor 110 coupled to control the light source 106 and to communicate via the communication interface. Such intelligent luminaires 102a may include lighting related sensors (not shown), such as occupancy sensors or ambient light color or level sensors; but the intelligent luminaires 102a do not include any user interface components for user input or for output to a user (other than control of the respective light source 106). The processors of the intelligent luminaires 102a are programmable to control lighting operations, for example, to control the light sources 106 of the intelligent luminaires 102a in response to commands received from the communication network 116 and the communication interfaces 108.

Other examples of the intelligent luminaires 102b, 102c, and 102d may include one or more user interface components. Although three examples are shown, it is envisaged that still other types of interface components or arrangements thereof in various intelligent lighting devices may be used in any particular implementation of a system like the light system 100. Any one intelligent luminaire that includes components to support the interactive user interface functionality of the light system 100 may include an input sensor type user interface component, an output type user interface component, or a combination of one or more input sensor type user interface components with one or more output type user interface components.

Each of some number of intelligent luminaires 102b at the premises 104 may include one or more sensors 126. The intelligent luminaires 102b can be in one or more rooms or other service areas at the premises 104. In the intelligent luminaires 102b, each of the sensors 126 is configured for detection of intensity of received light and to support associated signal processing to determine direction of incident light. A particular example of the sensor 126 that can be used as an input device for determining direction and intensity of incident light received by the sensor 126 is a quadrant hemispherical light detector or "QHD." The sensors 126 may detect light in some or all of the visible portion of the spectrum or in other wavelength bands, such as infrared (IR) or ultraviolet (UV). By using two or more such sensors 126 in the same or a different intelligent luminaire 102b illuminating the same service area, it is possible to detect position of an illuminated point or object in three-dimensional space relative to known positions of the sensors 126. By detecting position of one or more points over time, it becomes possible to track motion within the area illuminated by the intelligent luminaire(s) 102b and monitored for user input by the sensors 126, for example, as a gestural user input. Although two sensors 126 are shown on one intelligent luminaire 102b, there may be more sensors 126 or there may be a single sensor 126 in each intelligent luminaire 102b amongst some number of the intelligent luminaires 102b illuminating a particular service area of the premises 104.

In the example, at least one of the intelligent luminaires 102b also includes a lighting related sensor 127. Although shown in the intelligent luminaire 102b for purposes of discussion, such a sensor may be provided in any of the other intelligent luminaires 102, in addition or as an alternative to deployment of the sensor 127 in a lighting intelligent luminaire 102b. Examples of such lighting related sensors 127 include occupancy sensors, device output (level or color characteristic, which may include light color, light temperature, or both) sensors, and ambient light (level or color characteristic, which may include light temperature, or both) sensors. The sensor 127 may provide a condition input for general lighting control (e.g., to turn on or off the intelligent luminaires 102 or adjust outputs of the light sources 106). However, sensor input information from the sensor 127 also or alternatively may be used as another form of user input, for example, to refine detection and tracking operations responsive to signals from the sensors 126.

In an example of a user input related function, the signals from the sensors 126 in the intelligent luminaires 102b illuminating a particular room within the premises 104 are processed to detect gestures of one or more persons or users within the room. The lighting output from the light sources 106 of the devices 114 illuminating the area may be controlled responsive to the detection of one or more predetermined user input gestures. Although not shown, one or more of the intelligent luminaires 102b may also include a user output component, for example to provide an audio or video output of information to the person or persons in the room.

Such gesture input together with lighting control and other information output implement a form of interactive user interface. This interface related operation includes selectively controlling a lighting operation of at least some number of the lighting devices as a function of a processed user input. The interface related operation may also include either controlling a non-lighting-related function as a function of a processed user input, or an operation to obtain and provide information as a response to a user input as an output via the output component.

In the example of the light system 100, each of the intelligent luminaires 102c and one or more of the intelligent luminaires 102d in one or more rooms or other service areas of the premises 104 may support audio input and audio output for an audio based user interface functionality. Also, audio user interface components may be provided in other intelligent luminaires 102 that are different from those deploying the video user interface components. For convenience, the audio input and output components and the video input and output components are shown together in each of the intelligent luminaires 102c, one or more of which may be deployed with other lighting devices in some number of the services areas within premises 104.

In the example of FIG. 1, each intelligent luminaire 102c, one or more of the intelligent luminaires 102d, or a combination thereof includes an audio user input sensor such as a microphone 128. Any type of microphone capable of detecting audio user input activity, for example, for speech recognition of verbal commands or the like, may be used. Although the audio output may be provided in different devices 114, each of the intelligent luminaires 102c or 102d may include an audio output component such as one or more speakers 138 that provide information output to the user. Where the speaker 138 is provided, there may be a single speaker 138 or there may be a plurality of speakers 138 in each respective intelligent luminaire 102.

The audio input together with lighting control and audio information output implement an additional form of interactive user interface. The user interface related operation includes selectively controlling a lighting operation of at least some number of the intelligent luminaires 102 as a function of a processed user input. The interface related operation may also include either control of a non-lighting-related function as a function of a processed user input, or an operation to obtain and provide information as a response to a user input as an output via the output component. For example, a user audio input (e.g., a voice command) may be processed to control a non-lighting device 114 (e.g., an HVAC unit, a washer, a dryer, etc.) that is communicatively connected to the communication network 116. Further, the intelligent luminaires 102 may respond with audible information when the microphone 128 receives a user request for information (e.g., a weather update, movie show times, etc.).

In an example, a physical mechanism may be implemented to mute the microphones 128 of the intelligent luminaire 102 instead of implementing only a soft mute function (e.g., via software control) when the user would like privacy from the microphones 128 that may constantly be listening for a wake word. The physical mechanism may also be included on any other device with a microphone 128 that is constantly listening for a wake word. In other words, the microphones 128 may be muted using a mechanical or physical device rather than only a software routine. The hard mute design may incorporate a movable assembly into the intelligent luminaire 102 with components that physically (i.e., mechanically) create a temporary seal over any microphone porting holes of the microphone 128. The movable assembly can also activate an electro-mechanical or hall-effect switch that electrically disconnects the microphone signal paths for additional privacy and peace-of-mind.

A soft mute functionality of the microphone 128 may be performed simultaneously with the hard mute of the microphone 128 described above, or the soft mute functionality may be performed independently. The soft mute functionality is a software method that enables muting of the microphone 128 of the intelligent luminaire 102 remotely using a companion mobile application (e.g., on a mobile device or tablet). The soft mute functionality may preserve user privacy by enabling the user to mute voice assistant services of a virtual assistant enabled luminaire. In an example where the intelligent luminaire 102 is ceiling mounted and far away from the normal user, a hardware mute button may not be practical for an occupant of a room containing the intelligent luminaire 102. Using a software based mute button will provide a mechanism for the user to shut down the microphones 128 on the intelligent luminaire 102 to stop a voice service from listening to the user.

Implementing a software mute virtual button on a user interface of the mobile application may enable the user to press a button on the mobile application that results in the mobile device sending a mute command wirelessly to the intelligent luminaire 102. The mute command may instruct a microcontroller unit (MCU) to toggle a general-purpose input/output (GPIO) on a microphone switch circuit such that the GPIO removes a power supply from the microphones 128. Removing the power supply results in the microphone 128 being rendered non-operational until the GPIO is toggled again to reconnect the power supply with the microphone 128. For example, the GPIO may be toggled to reconnect the power supply upon receiving an unmute signal from the mobile device based on a user interaction with the mobile application, or the GPIO may be toggled upon automatically timing out the mute functionality after a specified amount of time. Removing the power supply from the microphone 128 functions in a similar manner to a hardware mute button except that the command from the user to the intelligent luminaire 102 is done remotely via wireless connection between the mobile application and the intelligent luminaire 102.

Although shown for illustration purposes in the intelligent luminaire 102c, image-based input and/or output components may be provided together or individually in any others of the intelligent luminaires 102 that may be appropriate for a particular installation. Although referred to at times as "video," the image-based input and/or output may utilize still image input or output or may use any appropriate form of motion video input or output. In the example of the light system 100, each of several of the intelligent luminaires 102d in one or more rooms of the premises 104 also supports image input and output for a visual user interface functionality.

For the visual user interface functionality an intelligent luminaire 102c includes at least one camera 140. The camera 140 could be a still image pickup device controlled to capture some number of images per second, or the camera 140 could be video camera. By using a number of cameras 140 to capture images of a given service area, it is possible to process the image data to detect and track user movement in the area, for example, to identify user input gestures. The multiple cameras 140 could be in a single intelligent luminaire 102c or could be provided individually in two or more of the lighting devices that illuminate a particular room or other service area. The image capture may also support identification of particular individuals. For example, individuals may be identified using facial recognition and associated customization of gesture recognition or user responsive system operations.

A visual output component in the intelligent luminaire 102c may be a projector 142, such as a pico projector. The visual output component may take other forms, such as an integral display as part of or in addition to the light source. The projector 142 can present information in a visual format, for example, as a projection on a table or a desk top or a wall or the floor. Although shown in the same intelligent luminaire 102c as the camera 140, the projector 142 may be in a different intelligent luminaire 102.

One or more of the processors 110 in the intelligent luminaires 102 are able to process user inputs detected by the user input sensor(s), such as the visual sensors 126, 128, 140, the microphone(s) 128, or a combination thereof. Other non-contact sensing technologies may also be used (e.g., ultrasound) instead of or in combination with the input sensors discussed above. The processing of sensed user inputs may relate to control operations of the intelligent luminaires in one or more areas of the premises 104. For example, the processing may detect spoken commands or relevant gestural inputs from a user to control the intelligent lighting devices in an area in which the user is located (e.g., to turn lights ON/OFF, to raise or lower lighting intensity, to change a color characteristic of the lighting, or a combination thereof).

In addition to lighting control functions, such as mentioned here by way of example, one or more of the processors 110 in the intelligent luminaires 102 may be able to process user inputs so as to enable the light system 100 to obtain and present requested information to a user at the premises 104. By way of an example of such additional operations, the light system 100 may also enable use of the intelligent luminaires 102 to form an interactive user interface portal for access to other resources at the premises 21 (e.g., on other non-lighting devices in other rooms at the premises) or enable access to outside network resources such as on the server 120 or a remote terminal 122 (e.g., via the WAN 118).

Any one or more of the intelligent luminaires 102 may include a sensor 144 for detecting operation of the light source 106 within the respective intelligent luminaire 102. The sensor 144 may sense a temperature of the light source 106 or sense other components of the intelligent luminaire 102. The sensor 144 may also sense an optical output of the light source 106 (e.g., a light intensity level or a color characteristic). The sensor 144 may provide feedback as to a state of the light source 106 or other component of the intelligent luminaire 102, which may be used as part of the general control of the intelligent luminaires 102.

The sensor 144 may also be a wireless or wired environmental monitoring element, and the intelligent luminaire 102 may include one or more of the sensors 144. Monitoring of environmental parameters using the intelligent luminaire 102 can provide information about the surrounding environment and the human occupancy status of a space where the intelligent luminaire 102 is installed. In some examples, the intelligent luminaire 102 may be referred to as a smart connected luminaire. The term "smart connected luminaire" may refer to a luminaire that is capable of communicating with other devices (e.g., environmental sensors, internet of things (IoT) devices, other luminaires, the internet, etc.). Further, the smart connected luminaire may be capable of receiving or sending signals from sensors or transducers of other IoT devices, processing the signals, and performing operations based on the processed signals.

In an example, the sensors 144 (e.g., detectors and sensors) may be integral within the intelligent luminaire 102, the sensors 144 may be wirelessly coupled to the intelligent luminaire 102, or the sensors 144 may be in wired communication with the intelligent luminaire 102. The sensors 144 provide environmental monitoring statuses to the intelligent luminaire 102. In turn, the intelligent luminaire 102 may provide the environmental monitoring statuses to a cloud computing service (e.g., at the server 120) for analytics. For example, the intelligent luminaire 102 may act as a wireless local area network (LAN) access point to all smart wireless LAN or Bluetooth capable detectors and sensors capable of connecting to the intelligent luminaire 102. In this manner, each detector or sensor may be monitored for its data, which may include and not be limited to temperature levels, light levels, gas detection, air quality detection, humidity levels, any other suitable statuses, or any combination thereof.

Additionally, the intelligent luminaire 102 may use voice activation services to monitor sound levels (e.g., using the microphone 128) in the environment surrounding the intelligent luminaire 102. By monitoring the sound levels, the intelligent luminaire 102 may be able to detect human presence and distinguish individual voices. The voice detection and distinction may be performed by training the intelligent luminaire 102 to detect and identify occupant voices using the luminaire microphone array (i.e., the microphone 128) that is used in the intelligent luminaire 102 for interacting with voice assistant voice services (e.g., Alexa® by Amazon Technologies, Inc., Google Now and Google Assistant by Google LLC, Cortana® by Microsoft Corporation, Siri® by Apple Inc., any other virtual assistant services, or any combination thereof).

The intelligent luminaire 102 may receive environmental health and monitoring data from any smart sensors 144 capable of communicating with the intelligent luminaire 102. The smart sensors 144 may include gas detectors, motion sensors, temperature and humidity sensors, light detectors, or any smart sensors capable of communicating with the intelligent luminaire 102. Industrial use sensors in communication with the smart collected light may collect machine sensor data in hazardous areas and process the data analytically. Additionally, preventative maintenance of industrial grade equipment may rely on outdoor or commercial space sensors in communication with the intelligent luminaire 102. Further, the intelligent luminaire 102 is able to provide the environmental monitoring data to a cloud computing service to pool and analyze the sensor data. The environmental monitoring detectors and sensors include but are not limited to: microphones; proximity sensors; cameras; LIDAR and SONAR; ultrasonic sensors; smoke and carbon monoxide detectors; temperature sensors; humidity sensors; barometric pressure sensors; light sensors; radios; Wi-Fi repeaters; or any other suitable detectors and sensors. These sensors may collect data that can be processed for functions that include but are not limited to: audio/video playback and alerts for sleep monitoring (e.g., a snoring monitor); audio/video playback and alerts for occupancy monitoring (e.g., baby monitors, nanny cams, elder care, etc.); alerts for smoke detection; alerts for carbon monoxide detection; alerts for security breaches; facial recognition; circadian rhythm monitoring; user occupancy detection; voice recognition; people counting; geofencing; temperature control based on room occupancy; lighting control based on room occupancy; temperature and lighting control based on received voice commands; any other suitable functions; or any combination thereof. Further, the sensors and functions may be used in residential environments, hotel environments, commercial environments, or any other environments. It may be expected that the intelligent luminaire 102 will act as a sensor hub that can source or synchronize environmental sensor data.

In the light system 100, the intelligent luminaires 102 incorporate the elements and provide processing to support an interactive user interface that does not require a user to touch or otherwise physically contact an element of the light system 100. The user also does not have to operate a separate device, such as a smartphone or other portable terminal device. The intelligent luminaires 102 implement the interactive user interface to the light system 100, and the user interacts with the light system 100 using the intelligent luminaires 102.

The light system 100 may also include or support communications for other elements or devices at the premises 104, some of which may offer alternative user interface capabilities instead of or in addition to the interactive user interface supported by the intelligent luminaires 102. For example, user interface elements of the light system 100 may be interconnected to the data communication network 116 of the light system 100. Standalone sensors of the lighting system may also be incorporated in the light system 100, where the standalone sensors are interconnected to the data communication network 116. At least some of the standalone sensors may perform sensing functions analogous to those of sensors 127 and 144.

The light system 100 may also support wireless communication to other types of equipment or devices at the premises 104 to allow the other equipment or devices to use the data communication network 116, to communicate with the intelligent luminaires 102, or both. By way of example, one or more of the intelligent luminaires 102 may include the wireless interface 124 for such a purpose. Although shown in the intelligent luminaire 102b, the wireless interface 124 may instead or in addition be provided in any of the other intelligent luminaires 102 in the light system 100. A wireless link offered by the wireless interface 124 enables the light system 100 to communicate with other user interface elements at the premises 104 that are not included within the intelligent luminaires 102. In an example, a remote control 146 may represent an additional input device operating as an interface element and a television or monitor 148 may represent an additional output device operating as an interface element. The wireless links to devices like the remote control 146 or the television or monitor 148 may be optical, sonic (e.g., speech), ultrasonic, or radio frequency, by way of a few examples.

In an example, the intelligent luminaires 102 are controllable with a wall switch accessory 150 in addition to direct voice control or gesture control provided to the intelligent luminaire 102, as discussed above. The wall switch accessory 150 wirelessly connects to the virtual assistant enabled luminaire or other compatible device using the wireless interface 125. The wireless connection between the wall switch accessory 150 and the intelligent luminaire 102 enables voice and manual control of the luminaire to extend the control range available to the luminaire.

A location of the intelligent luminaire 102 may create a situation where the intelligent luminaire 102 is too far from a user to detect audible commands from the user. Additionally, acoustic interference during speaker audio playback may prevent the intelligent luminaire 102 from detecting audio commands from the user. In one or more examples, the location of the intelligent luminaire 102 (e.g., in a ceiling) may not provide the user with physical access to interact with the device to overcome the distance and interference issues associated with detecting the audible commands from the user.

The wall switch accessory 150 extends many of the intelligent luminaire features and abilities through a wireless connection. The wall switch accessory 150 addresses the physical distance issue by replacing a set of microphones 128 contained in the intelligent luminaire 102 with a set of microphones 128 located at another location within the room. In another example, the wall switch accessory 150 addresses the physical distance issue by adding additional microphones 128 associated with the luminaire at the other location within the room. Further, the wall switch accessory 150 provides a mechanism for the user to press a physical button 152 to instruct the microphones in the wall switch accessory 150 to listen to a voice command.

In an example, the wall switch accessory may provide a voice stream received at the microphones 128 in the wall switch accessory 150 to the intelligent luminaire 102 through a Bluetooth connection. In another example, the wall switch accessory 150 may provide the voice stream to the luminaire through a shared cloud account using Wi-Fi. For example, the wall switch accessory 150 may provide the voice stream to a cloud account (e.g., a voice service cloud account) through a wireless router, and the cloud account processes the voice stream and provides a command or request associated with the voice stream to the intelligent luminaire 102. Other wireless communication protocols are also contemplated for the transmission of the voice stream to the intelligent luminaire 102.

The wall switch accessory 150 can also instruct the intelligent luminaire 102 to pause or mute audio playback while the voice commands are being communicated. In an example, the wall switch accessory 150 may have physical buttons (e.g., the button 152) to allow the user to control features of the intelligent luminaire 102 when the device is unreachable for direct physical interaction. The controllable features of the intelligent luminaire 102 may include increasing or decreasing a speaker volume of the luminaire, pausing or playing music playback through the speaker of the luminaire, muting a speaker output of the luminaire, muting the microphones of the luminaire and the wall switch accessory for privacy, increasing or decreasing a lamp brightness of the luminaire, changing a lamp color temperature of the luminaire, or turning off the lamp of the luminaire. The physical buttons of the wall switch accessory 150 capable of controlling the controllable features of the intelligent luminaire 102 may perform the control through Bluetooth connections, Wi-Fi connections, or any other suitable wireless communication connections.

Further, other devices may be used in place of the wall switch accessory 150. For example, the functionality of the wall switch accessory 150 may be integrated in a device that also controls non-lighting functions. Other functions of the intelligent luminaire 102 may also be provided remotely. For example, lights or other elements used for non-verbal communication may be incorporated as part of the wall switch accessory 150 or other devices that perform similar functions.

The intelligent luminaires 102, as discussed above and shown in the FIG. 1, may include user interface related components for audio and optical (including image) sensing of user input activities. The intelligent luminaire 102 also includes interface related components for audio and visual output to the user. These capabilities of the intelligent luminaires 102 and the light system 100 support an interactive user interface through the lighting devices to control lighting operations, to control other non-lighting operations at the premises, to provide a portal for information access (where the information obtained and provided to the user may come for other equipment at the premises 104 or from network communications with off-premises systems), or any combination thereof.

For example, the intelligent luminaire 102 or the light system 100 can provide a voice recognition/command type interface using the intelligent luminaire 102 and the data communication network 116 to obtain information, to access other applications or functions, etc. For example, a user at the premises 104 can ask for information such as a stock quote or for a weather forecast for the current location of the premises 104 or for a different location than the premises 104. The user can ask the system to check a calendar for meetings or appointments and can ask the system to schedule a meeting.

In an example, the speech may be detected and digitized in the intelligent luminaire 102 and is processed to determine that the intelligent luminaire 102 has received a command or a speech inquiry. For an inquiry, the intelligent luminaire 102 sends a parsed representation of the speech through the light system 100 (and possibly through the WAN 118) to the server 120 or to a processor within one of the intelligent luminaires 102 with full speech recognition capability. The server 120 identifies the words in the speech and initiates the appropriate action to obtain requested information from an appropriate source via the Internet or to initiate an action associated with the speech. The server 120 sends the information back to the intelligent luminaire 102 (or possibly to another device) with the appropriate output capability, for presentation to the user as an audible or visual output. Any necessary conversion of the information to speech may be done either at the server 120 or in the intelligent luminaire 102, depending on the processing capacity of the intelligent luminaire 102. As the processing capacity of lighting devices increases, some or all of the functions of the server in this example may be shifted into the lighting devices.

The intelligent luminaire 102 and the light system 100 may provide similar services in response to gestural inputs, detected via the sensors 126, one or more cameras 140, or a combination of sensors and cameras. Also, systems that include both audio and optical input components can respond to combinations of speech and gestural inputs. Systems that include both audio and video output components can present information to the user in various desirable combinations of audio and image or video outputs.

In an example, the intelligent luminaire 102 incorporates artificial intelligence of a virtual assistant. For example, the intelligent luminaire 102 may include functionality associated with voice assistants such as Alexa® by Amazon Technologies, Inc., Google Now and Google Assistant by Google LLC, Cortana® by Microsoft Corporation, Siri® by Apple Inc., any other virtual assistants, or any combination thereof. The virtual assistant enabled functionality of the intelligent luminaire 102 provides voice enabled control of the luminaire lighting features such as a correlated color temperature (CCT) output by the intelligent luminaire 102, lumens output by the intelligent luminaire 102, a configuration of the intelligent luminaire 102, operational modes of the intelligent luminaire 102 (e.g., environmental detection modes, occupancy detection modes, etc.), configuration of any other networked luminaires, any other luminaire lighting feature, or any combination thereof.

Further, in the intelligent luminaires 102 including the speakers 138, the virtual assistant enabled functionality of the intelligent luminaire 102 controls speaker features such as volume, bass, independent channel control, other speaker features, or any combination thereof. The speaker 138 within or associated with the intelligent luminaire 102 may be a speaker element that includes a single speaker or a multiple speaker arrangement. For example, the speaker 138 may be a coaxial loudspeaker with two or more drive units. In such an example, a tweeter may be mounted in front of a subwoofer, and the virtual assistant enabled functionality of the intelligent luminaire 102 is able to control speaker features of both the tweeter and the subwoofer. The speaker 138 may also be a midwoofer-tweeter-midwoofer (MTM) loudspeaker configuration. In the MTM configuration, the virtual assistant enabled intelligent luminaire 102 is able to control speaker features of all three of the drive units (i.e., drive units for the two midwoofers and the tweeter).

The speaker 138 of the intelligent luminaire 102 may be integrated with the intelligent luminaire 102 or be a modular sub-assembly that is capable of being added to or removed from the intelligent luminaire 102. The speaker 138 may include one or more cosmetic pieces to cover the speaker 138 such as a grill or cloth that is acoustically transparent. The cosmetic piece could also be highly reflective in addition to being acoustically transparent. Accordingly, the cosmetic pieces may be installed to balance aesthetic quality, acoustic quality, and light emission quality.

The virtual assistant enabled intelligent luminaire 102 may also include a lens with a beam shaping (e.g., optical distribution) functionality. The virtual assistant may provide control of the intelligent luminaire 102 to control the beam shaping functionality. A lighting element (e.g., the light source 106) of the intelligent luminaire 102 may be a backlight or a waveguide design. Further, the lighting element may be perforated in numerous different arrangements to optimize sound waves that are transmitted through the lighting element from a speaker 138 positioned behind the lighting element.

In an example, the intelligent luminaire 102 may provide a mechanism for non-verbal communication with a user via visual feedback controlled by the virtual assistant. The non-verbal communication may be achieved through accent lighting on a trim ring of the intelligent luminaire 102, or any other lighting features incorporated within the intelligent luminaire 102. For example, the virtual assistant may control the main lighting output of the intelligent luminaire 102 to change colors or change illumination patterns or levels to provide the non-verbal communication to an occupant of a room within the premises 104.

The intelligent luminaire 102 with audio functionality may visually mask audio producing elements (e.g., the speakers 138) with an acoustically transparent lens positioned on a side of the intelligent luminaire 102 facing a room or other area of the premises 104 that is illuminated by the intelligent luminaire 102. For example, it may be desirable to incorporate the speaker 138 within the intelligent luminaire 102 to provide hidden audio within the premises 104. The presently disclosed subject matter includes multiple ways to improve the look of the speaker 138 and light source 106 of a luminaire (e.g., the intelligent luminaire 102) while allowing for airflow of the speaker 138 to produce satisfactory audio.

In an example, the intelligent luminaire 102, or a set of intelligent luminaires 102, may provide location based services. For example, indoor user positioning may involve a number of location sensing technologies that combine various methods to detect a user location indoors. While GPS is typically limited to functioning outdoors, indoor positioning may be needed to estimate user positions during emergency scenarios and while trying to place user locations indoors accurately on a facility map.

The intelligent luminaires 102 that are equipped with virtual assistant voice services (e.g., Alexa® by Amazon Technologies, Inc., Google Now and Google Assistant by Google LLC, Cortana® by Microsoft Corporation, Siri® by Apple Inc., any other virtual assistant services, or any combination thereof) can be used to provide coarse indoor user positions while a user is invoking the intelligent luminaire 102 to execute voice service commands. Other indoor positioning technologies may also be deployed that rely heavily on a radio frequency signature map or trilateration techniques using radio frequency signal strengths. The presently disclosed subject matter leverages audio sniffing capabilities (e.g., listening for wake words) of the intelligent luminaires 102 that support virtual assistant voice services to be able to detect a specific user and provide the specific user with the user's present location in accordance with a previously surveyed virtual assistant voice service enabled intelligent luminaire 102.

The intelligent luminaire 102 may provide a method of proximity detection. The method of proximity detection may calculate user location coordinates based on detecting a specific user according to a voice profile or voice signature of the specific user. The intelligent luminaire 102 may support voice assistant services and also support a voice recognition engine. Multiple microphone arrays (e.g., the microphones 128) may be deployed in one or more intelligent luminaires 102 to detect user voice profiles and execute voice commands according to various voice service platforms. In an example, a user voice signature or profile is detected and recognized after being compared to a stored voice signature or profile of the user. Upon detection, the smart connected luminaire is able to provide coarse coordinates of a location of the user to a location server. The coarse coordinates are based on coordinates associated with the intelligent luminaire 102 and the ability to detect the user voice only within a specific distance from the intelligent luminaire 102 (e.g., within a 10 or 15 foot radius). Thus, the coarse coordinates are accurate to within that distance.

In an example, the intelligent luminaire 102 may know its own coordinates (e.g., a location within a room in which the intelligent luminaire 102 is installed), and the intelligent luminaire 102 provides an indication of the coordinates to the location server when identifying and locating a user. In another example, the intelligent luminaire 102 does not know its own coordinates, and the intelligent luminaire 102 provides an indication of its identifier to the location server. In such an example, the location server assigns the coarse coordinates to the user based on the identifier of the intelligent luminaire 102 and the known coordinates of the individual intelligent luminaires 102 stored at the location server. In one or more examples, the cameras 140 may work in conjunction with the intelligent luminaires 102 to provide even more precision to the coarse coordinates. For example, the cameras can detect a specific position of the user within a room after the intelligent luminaire 102 has identified the room in which the user is located.

In one or more examples, the intelligent luminaire 102 may provide Voice over Internet Protocol (VoIP) services. Office conference rooms may include table top conference bridge systems. The conference bridge systems include deficiencies such as: consuming table top space; no "smart" capabilities (e.g., no ability to connect or communicate with other devices or networks); inability to store contact lists; difficulty associated with dialing numbers through a touch panel; and poor sound quality at certain table positions. Similarly, home phones include deficiencies such as: difficulty associated with storing contact lists; insufficient sound volume (e.g., suitable for a single person or a small group); or insufficient microphone capabilities.

The intelligent luminaire 102, or a set of intelligent luminaires 102, with the built-in microphone array (e.g., the microphone 128), the speaker 138, Wi-Fi connectivity, voice control capability, and mobile application compatibility can provide VoIP services. The VoIP service may be provided by the intelligent luminaire 102 by creating an account with a VoIP service provider, such as Google Voice, or by linking the intelligent luminaire 102 with other VoIP applications, such as Skype. Dial, answer, and decline functions of the VoIP service may be realized through a mobile application capable of controlling operations of the intelligent luminaire 102 or through voice commands provided to the intelligent luminaire 102. A contact list may be created in the mobile application or synched with an existing phone contact list. The intelligent luminaire 102 may be installed in the ceiling of an office conference room to save table space. Further, the intelligent luminaire 102 may enhance a user experience and user interface through the use of high configuration hardware (e.g., smart phones or tablets) and provide enhanced sound quality utilizing better speakers 138 and overhead sound transmission.

In an example, the intelligent luminaire 102 may include a selectable power-on light level scheme. The intelligent luminaire 102 (e.g., lamps or luminaires) may include a function that enables a light output to be turned off through a voice command or through a mobile application in addition to a wall switch. When an input power to the intelligent luminaire 102 resets due to a power outage, the intelligent luminaire 102 may include a recovery setting from a power outage state. In an example, an uncertainty of the recovery setting may cause inconvenience, frustration, and confusion to the user when the input power is removed and returned at undesirable times.

For example, if the intelligent luminaire 102 is designed to turn on when the input power is reset, then the user may be woken up in the middle of the night upon reestablishing power after the power outage. On the other hand, if the intelligent luminaire 102 is designed to maintain its previous state from before the power outage, a new user (e.g., a visitor) who is not familiar with the operation of the intelligent luminaire 102 will not be able to turn on the light without using the voice command or mobile application when the state before the power outage was off.

To address these issues, the intelligent luminaire 102 may include a selectable power-on light level scheme that enables the user to select or program the luminaire behavior modes upon resolution of a power outage. These modes may include but are not limited to: 1. a previous state; 2. a default state 1; 3. a default state 2; 4. a previous state before "OFF"; 5. a custom state. In one or more examples, different intelligent luminaires 102 may be programmed to different luminaire behavior modes. Further, the luminaire behavior modes may be programmed based on the cause of the power cycle. For example, if the power cycle is due to a power outage, the mode may be one of the default states. However, if the power cycle is due to a user's action, the mode may be the previous state before the power cycle. Moreover, the luminaire behavior modes may be programmed based on time of day. For example, a luminaire 102 experiencing a power outage that occurs at 2 a.m. may be programmed to remain off upon resolution of the power outage. In another example, a luminaire 102 experiencing a power outage that occurs at 7 p.m. may be programmed to return to a most recent state before the power outage.

Further, the intelligent luminaire 102 may include a system for updating software and firmware of the intelligent luminaire 102 using an over the air (OTA) scheme. In an example, the intelligent luminaire 102 provides a mechanism (e.g., the communications interface 108) for an OTA interface to a single-board computer (SBC) or main printed circuit board (PCB) of the intelligent luminaire 102 to communicate firmware updates to the processor 110 of the intelligent luminaire 102 without loading microcontroller unit (MCU) firmware separately. For example, using a specific test fixture, the SBC may pass through MCU firmware to the MCU using the OTA interface. The MCU firmware may be updated over the air similar to other devices or module firmware, such as the Wi-Fi module firmware or the SBC processor software. A UART communication and flash memory may be used to facilitate transfer of the MCU firmware from the SBC to the MCU. Further, this process may occur between the SBC and any non-volatile block of the intelligent luminaire 102.

Figure 2:
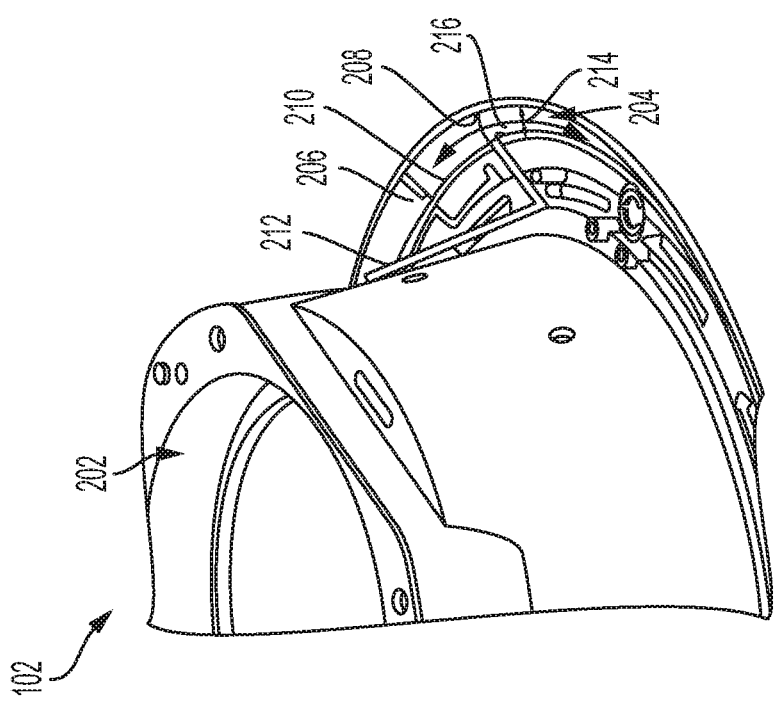
FIG. 2 depicts a portion of a housing of an intelligent luminaire of FIG. 1 including an integrated slot antenna, according to certain aspects of the present disclosure.

FIG. 2 depicts a portion of a housing 202 of an intelligent luminaire 102 that includes an integrated slot antenna 204. In an example, the slot antenna 204 is a dual-band slot antenna system. The slot antenna 204 may be communicatively coupled to, or form a portion of, the wireless interface 124 of the intelligent luminaire 102. For example, the slot antenna 204 may receive wireless signals that are decoded by the wireless interface 124, and the slot antenna 204 may transmit wireless signals that are encoded by the wireless interface 124.

In an example, the slot antenna 204 is positioned at an edge of a trim 206 of the luminaire such that the effect of a metallic can (not shown) in which the luminaire is mounted is minimal. In an example, the trim 206 may extend beyond a ceiling surrounding the intelligent luminaire 102 such that the slot antenna 204 is not obstructed by the metallic can or the ceiling. The slot antenna 204 may include antenna apertures that are cut out of metallic pieces of the trim 206. The slot antenna 204 may be coupled to a voltage source that provides energizing voltages to sides 208 and 210 of the slot antenna 204 to excite the slot antenna 204. When excited, the slot antenna 204 may radiate radio frequency energy. Further, the slot antenna 204 radiating the radio frequency energy may operate similarly to a half-wave dipole antenna.

The slot antenna 204 includes a single-feed, single-band slot antenna mounted on the edge of the trim 206 of the intelligent luminaire 102. The single-feed is an alternating current (AC) (e.g., radio frequency (RF)) voltage source provided by a coaxial cable 212. A positive line of the coaxial cable 212 is attached to one side of the slot antenna 204 (e.g., the side 210), and a negative line of the coaxial cable 212 is attached to an opposite side of the slot antenna 204 (e.g., the side 208). Exciting the slot antenna 204 with a voltage from the coaxial cable may result in electrical field that radiates RF energy based on the voltage applied to the sides of the antenna slot and the length and width of the antenna slot (i.e., dimensions of the antenna slot). Additionally, a width 214 and a length 216 of the slot antenna 204 may determine a frequency of the slot antenna 204 at maximum efficiency.

Figure 3:
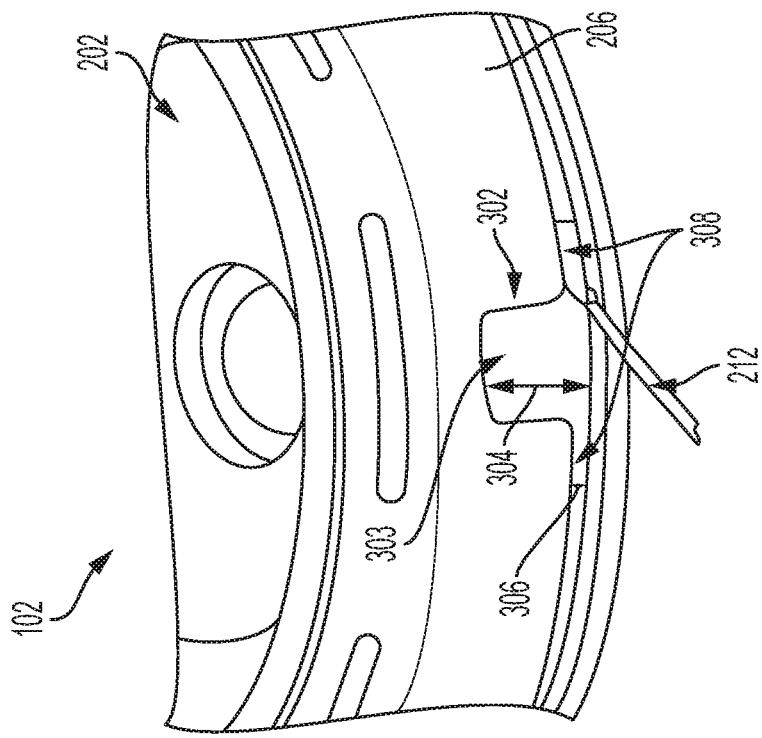
FIG. 3 depicts a portion of a trim of an intelligent luminaire of FIG. 1 including an additional example of an integrated slot antenna, according to certain aspects of the present disclosure.

FIG. 3 depicts a portion of the trim 206 of the housing 202 of the intelligent luminaire 102 including an additional example of an integrated slot antenna 302. The slot antenna 302 includes a single-feed, dual-band slot antenna mounted on an edge portion of the trim 206 of the intelligent luminaire 102. As illustrated, the slot antenna 302 includes a single aperture excited by a single coaxial cable 212, but the slot antenna 302 includes a first section 303 with a width 304 that is different from a width 306 of a second section 308. The varying widths 304 and 306 in the slot antenna 302 enable the slot antenna 302 to radiate RF energy at two different frequencies. For example, the slot antenna 302 may radiate RF energy at both a 2.4 GHz frequency band (e.g., Bluetooth or WiFi) and a 5 GHz frequency band (e.g., WiFi). Other frequency bands are also contemplated. This arrangement may increase the bandwidth of the slot antenna 302 by enabling communication on two separate frequency bands simultaneously.

Figure 4:
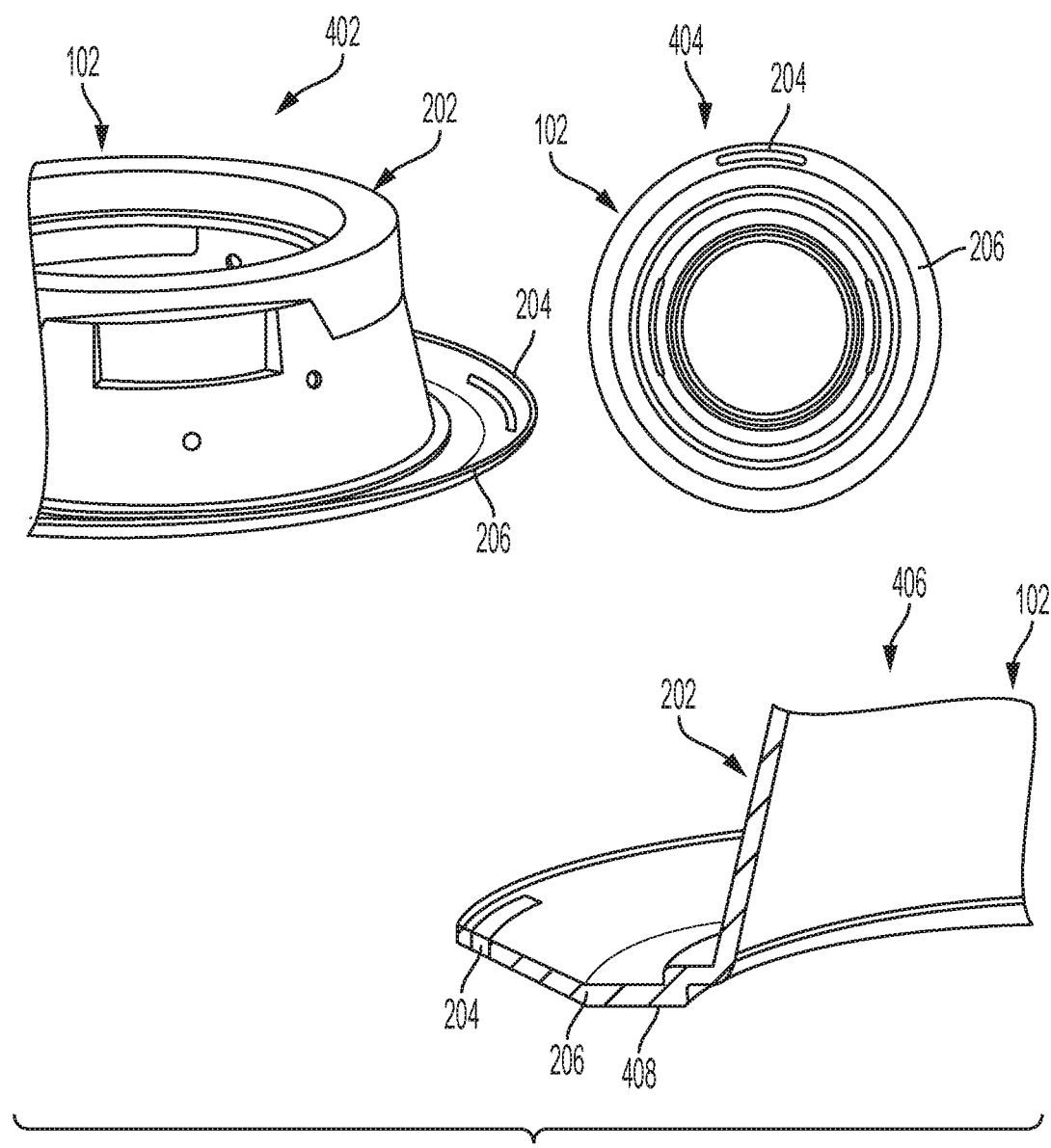
FIG. 4 depicts the housing of the intelligent luminaire of FIG. 1 including the integrated slot antenna of FIG. 2 in a perspective view, an underside view, and a sectional view, according to certain aspects of the present disclosure.

FIG. 4 depicts the housing 202 of the intelligent luminaire 102 including the integrated slot antenna 204 in a perspective view 402, an underside view 404, and a sectional view 406. As shown in the sectional view 406, the slot antenna 204 may extend through an entirety of the trim 206. Further, the trim 206 may extend along a room side of the ceiling in which the intelligent luminaire 102 is installed to avoid interference from a metal can in which the intelligent luminaire 102 is installed. Further, while FIG. 4 shows a single-feed, single-band slot antenna 204, other slot antennas are also contemplated. For example, a single-feed, dual-band slot antenna 302 may be similarly positioned within the trim 206. Further, multiple slot antennas 204 may be positioned at varying depth levels of the trim 206. For example, one slot antenna 204 may be positioned as illustrated in the sectional view 406, and a second slot antenna 204 may be positioned on a flat surface 408 of the trim 206. Other arrangements of multiple slot antennas 204 on the trim 206 may include the slot antennas 204 positioned on multiple planes or depth levels of the trim 206, along multiple shapes of the trim 206, or a combination thereof.

Figure 5:
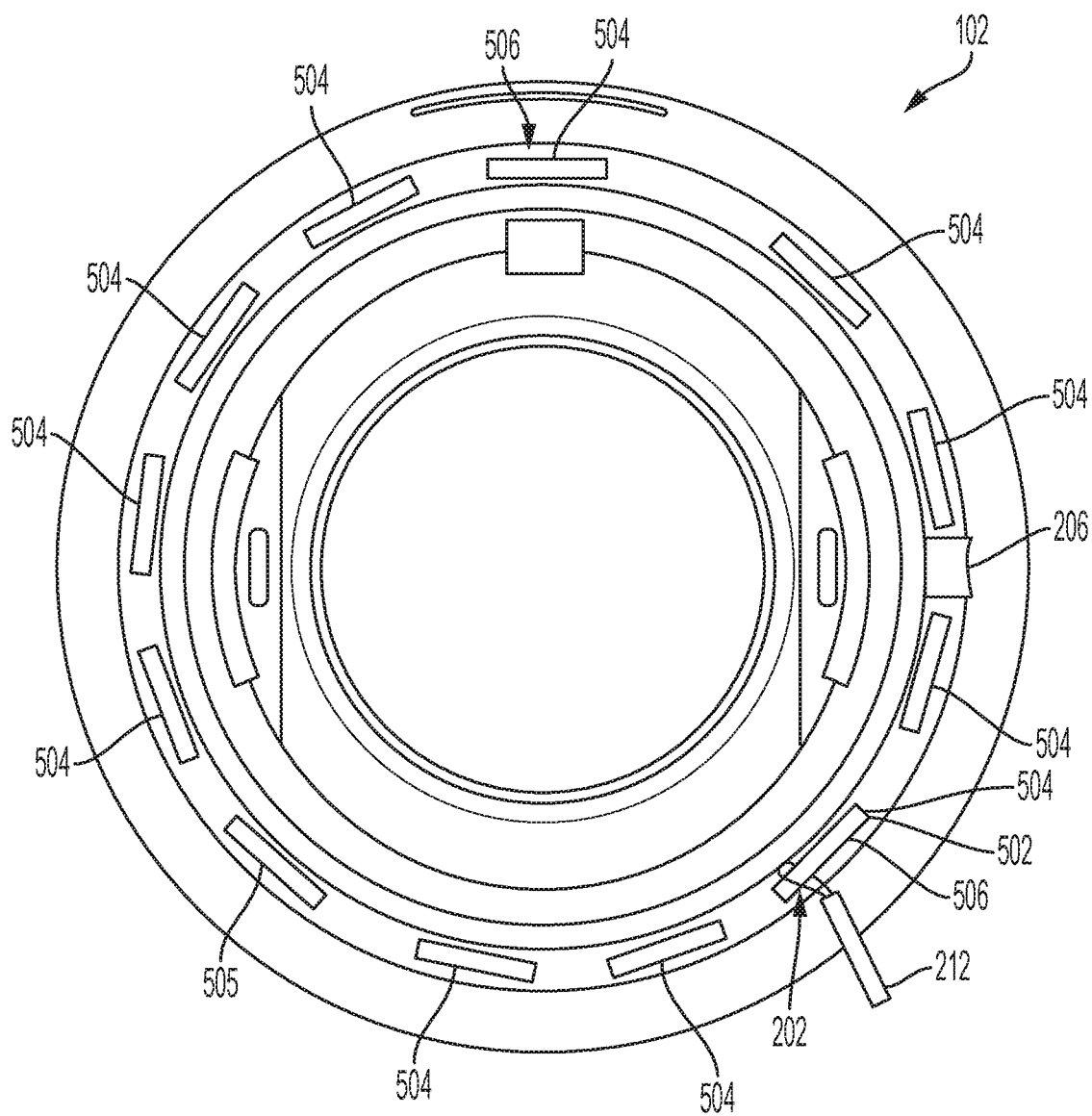
FIG. 5 depicts an underside view of the trim of the intelligent luminaire of FIG. 1 including the integrated slot antenna located in a visual feedback slot of the intelligent luminaire, according to certain aspects of the present disclosure.

FIG. 5 depicts an underside view of the trim 206 of the intelligent luminaire 102 including the integrated slot antenna 202 located in a visual feedback slot 502 of the intelligent luminaire 102. In this example, the intelligent luminaire 102 may take advantage of slots already cut into the trim 206 of the intelligent luminaire 102. For example, the intelligent luminaire 102 may include visual feedback slots 504. The visual feedback slots 504 may ring the trim 206 of the intelligent luminaire 102, and each of the visual feedback slots 504 may be filled with a light guide element 506 (e.g., plastic that guides light from a light source into a room) that provides non-verbal communication signals to occupants of a room that includes the intelligent luminaire 102. These visual feedback slots 502 may be energized by the coaxial cable 212 to radiate the RF signal. The light guide element, or any other plastic fill in the visual feedback slots 504, may provide little or no interference to the operation of such a slot antenna. In other designs that do not include the visual feedback slots 504 (e.g., as described above in FIGS. 2-4), the slot antenna 202 or 304 may be filled with a plastic fill such that the slot antenna matches the appearance of the trim 206 (e.g., a colored plastic fill with a color that matches the color of the trim 206).

Figure 6:
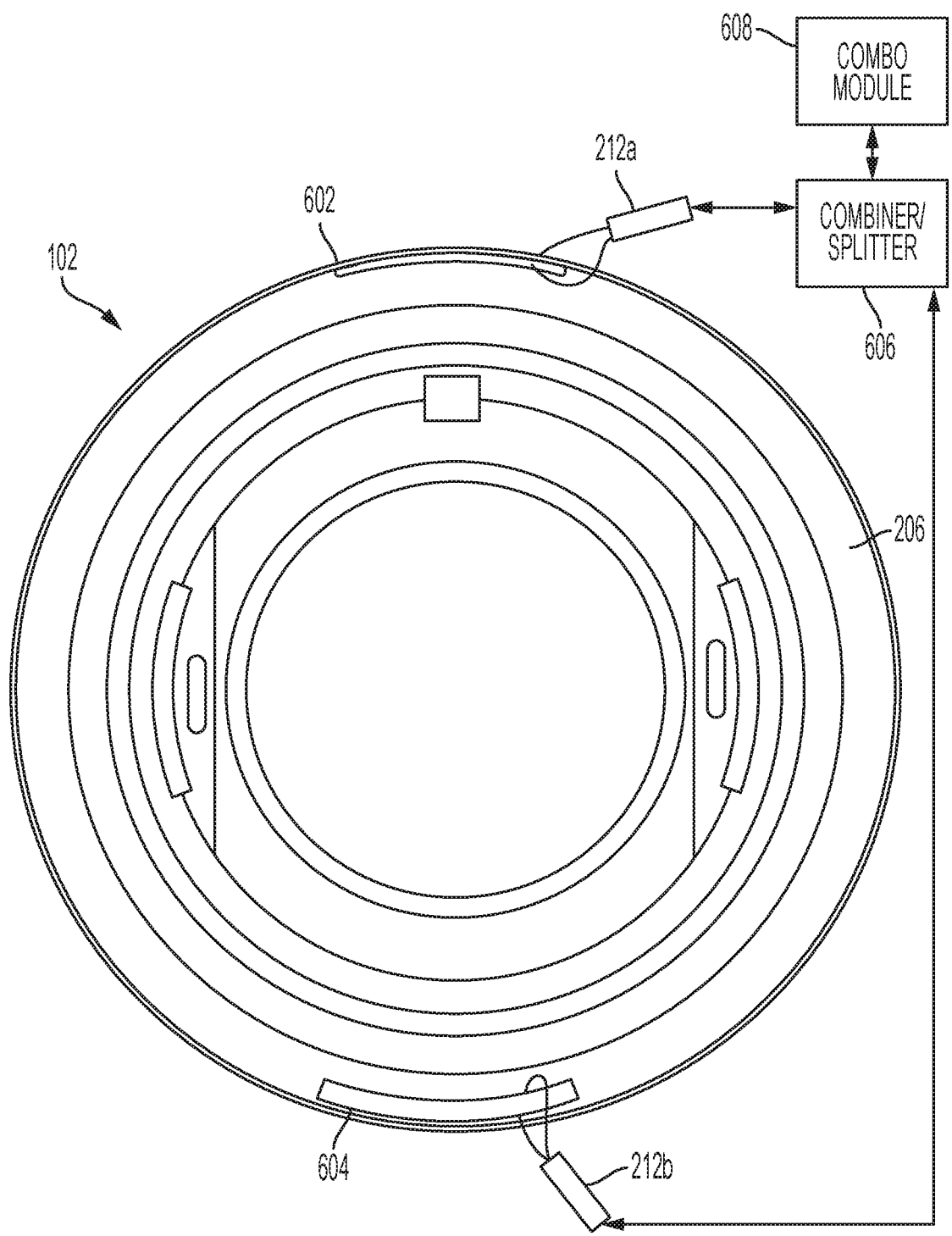
FIG. 6 depicts an underside view of the trim of the intelligent luminaire of FIG. 1 including a dual-feed, dual-band slot antenna, according to certain aspects of the present disclosure.

FIG. 6 depicts an underside view of the trim 206 of the intelligent luminaire 102 including a dual-feed, dual-band slot antenna. In such an example, a first slot 602 and a second slot 602 of differing dimensions are each energized by separate coaxial cables 212a and 212b. The energy feeds may be combined at a combiner/splitter 606 and are fed into a WiFi combination module 608. The result is the dual-feed, dual-band slot antenna that achieves two frequency resonances at the two antenna slots (e.g., a 2.4 GHz frequency band and a 5 GHz frequency band).

Figure 7:
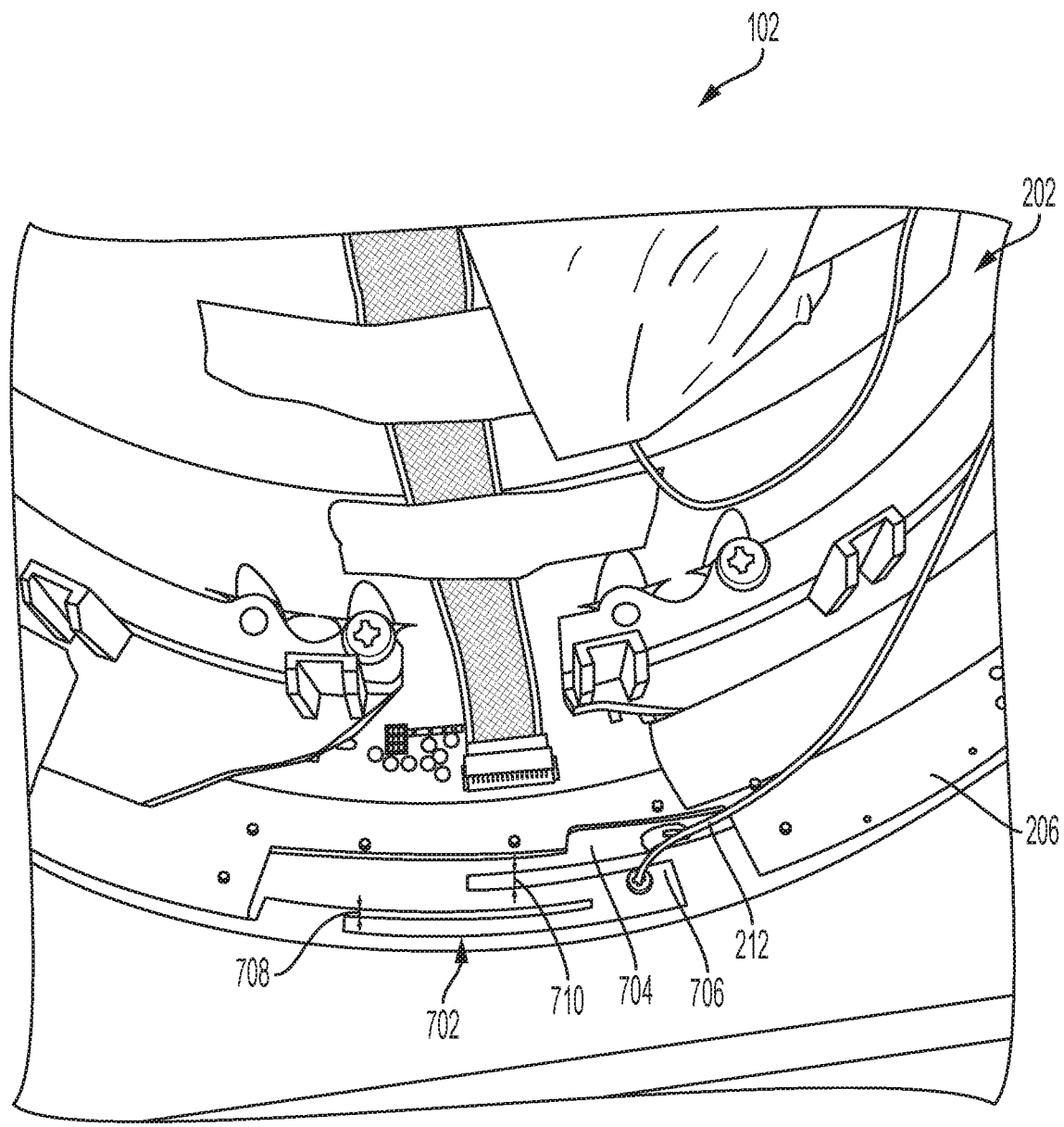
FIG. 7 depicts a portion of a housing of an intelligent luminaire of FIG. 1 including an integrated single-source, double-band inverted F antenna, according to certain aspects of the present disclosure.

FIG. 7 depicts a portion of a housing 202 of an intelligent luminaire 102 including an integrated, inverted F antenna 702. The metallic trim 206 of the luminaire housing 202 may be modified to extend the trim 206 (e.g., by 3.5 mm-4 mm) such that an antenna structure is placed outside of a radius of a metallic can in which the intelligent luminaire 102 is positioned. These antenna structures may be stamped (e.g., as in FIGS. 7 and 8) or etched (e.g., as in FIGS. 10 and 11). That is, the inverted F antenna 702 may include antenna apertures that are cut out of metallic trim pieces of the trim 206 or stamped onto non-metallic material and attached or otherwise coupled to the trim 206 of the intelligent luminaire 102. The inverted F antenna 702 may also be coupled to a voltage source using a coaxial cable 212 that provides an energizing voltage to sides 704 and 706 of the inverted F antenna 702 to excite the inverted F antenna 702. When excited, the antenna apertures may radiate radio frequency energy. Further, the antenna apertures radiating radio frequency energy may operate similarly to half-wave dipole antennas. In an example, the inverted F antenna 702 and the slot antennas 202 and 304 may be referred to as aperture antennas.

The inverted F antenna 702 may be a single-source, dual-band antenna system. For example, the inverted F antenna 702 may operate at frequencies of both 2.4 GHz and 5 GHz due to the shape of the inverted F antenna 702. In particular a width 708 of the inverted F antenna 702 is different from a width 710 of the inverted F antenna 702. The differing widths 708 and 710 enable operation of the inverted F antenna 702 at two different frequencies. Other stamped antenna structures are also contemplated for the antenna to operate at other frequencies.

Figure 8:
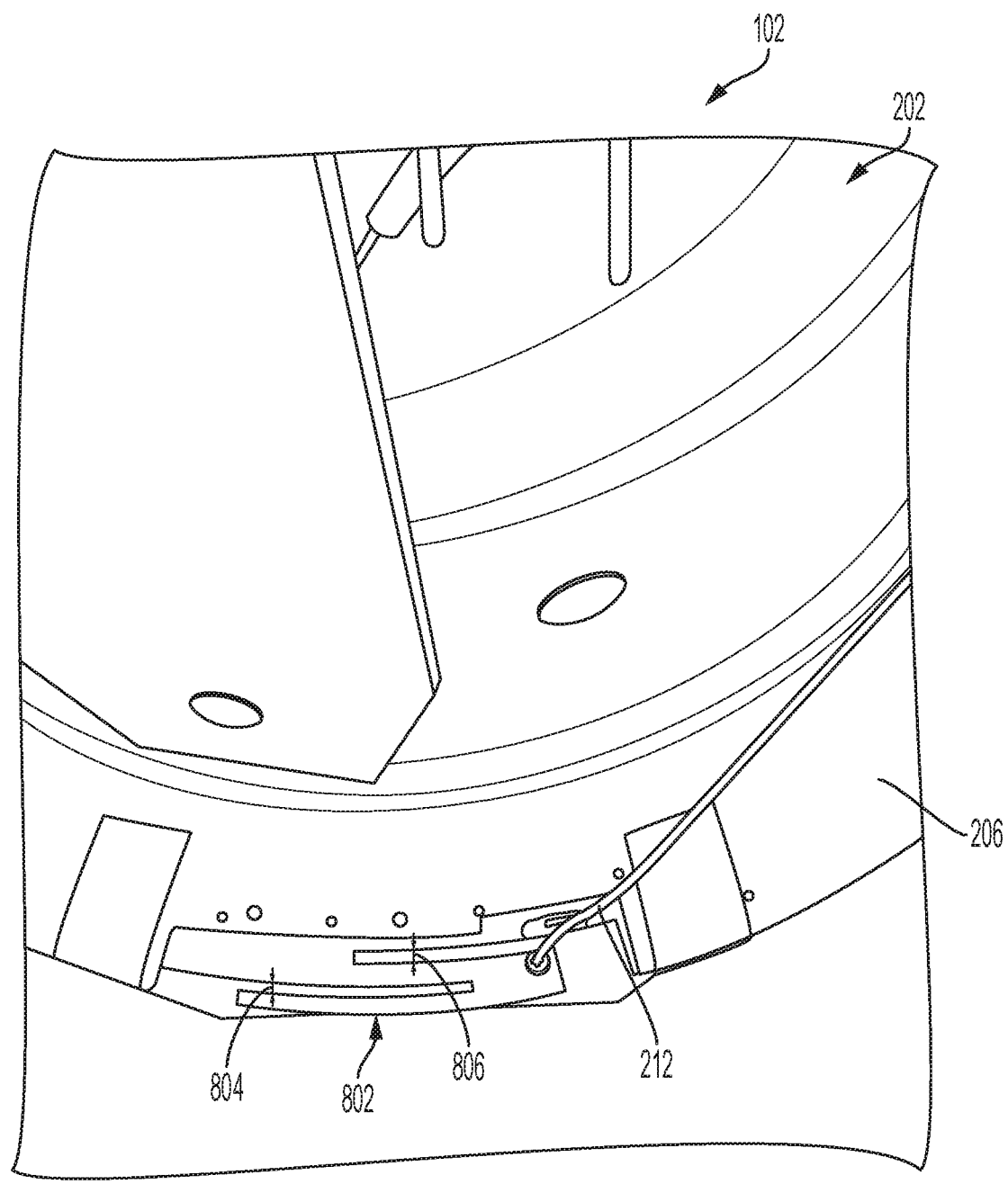
FIG. 8 depicts a portion of a housing of an intelligent luminaire of FIG. 1 including an integrated single-source, single-band inverted F antenna, according to certain aspects of the present disclosure.

FIG. 8 depicts a portion of a housing 202 of an intelligent luminaire 102 including an integrated single-source, single-band inverted F antenna 802. In an example, the inverted F antenna 802 may operate at frequencies of approximately 2.4 GHz. In particular a width 804 of the inverted F antenna 802 is the same as a width 806 of the inverted F antenna 802. The widths 708 and 710 of the same size may result in operation of the inverted F antenna 702 at a single frequency. Other stamped antenna structures are also contemplated for the antenna to operate at other frequencies.

The inverted F antennas 702 and 802 provide mechanisms for wireless communication with the intelligent luminaires 102 to perform well even when the intelligent luminaire 102 is installed within the metallic recessed cans (not shown) in the ceiling (not shown). As the metallic recessed can is made of metal, the metallic recessed can may tend to reshape and distort antenna signals of an antenna that is positioned inside the metallic recessed can. Further, operation of an antenna system within the metallic recessed can may impact the overall radiated efficiency of the antenna system that is integrated into the intelligent luminaire 102, as the metallic recessed can may act as a metal enclosure around the antenna. Accordingly, the inverted F antennas 702 and 802 are mounted at an edge of the trim 206 of the intelligent luminaire 102 such that the effect of the metallic recessed can on the inverted F antenna 702 or 802 is limited.

Figure 9:
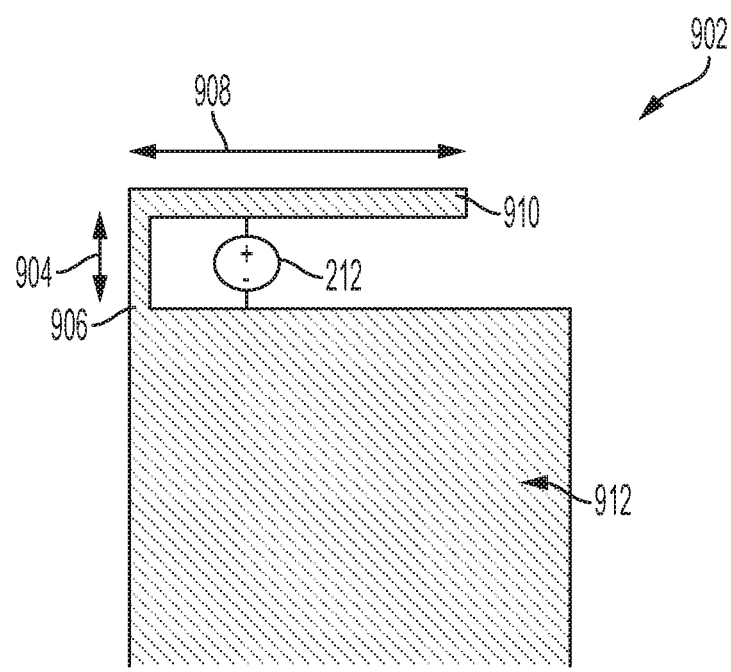
FIG. 9 depicts an example of an inverted F antenna structure, according to certain aspects of the present disclosure.

FIG. 9 depicts an inverted F antenna (IFA) 902 that may be used for the dual-band inverted F antenna 702 or the single-band inverted F antenna 802 described herein. The IFA 902 can provide a reliable structure capable of achieving reasonable efficiency and gain parameters in the presence of the recessed metallic can. The IFA 902 may be tuned against the design of the recessed metallic can in which the intelligent luminaire 102 that includes the IFA 902 (e.g., the inverted F antenna 702 or 802) is installed. In one or more examples, the IFA 902 may be tuned to a gain greater than 20 dB, and the IFA 902 may target a raw efficiency of greater than 55%.

Tuning the IFA 902 may involve shortening or lengthening a width 904 of a shorting pin 906. Further, the IFA 902 may be tuned by shortening or lengthening a length 908 of a monopole antenna 910 running parallel to the ground plane 912. In some examples, both the shorting pin 906 and the monopole antenna 910 may be adjusted to tune the IFA 902.

Figure 10:
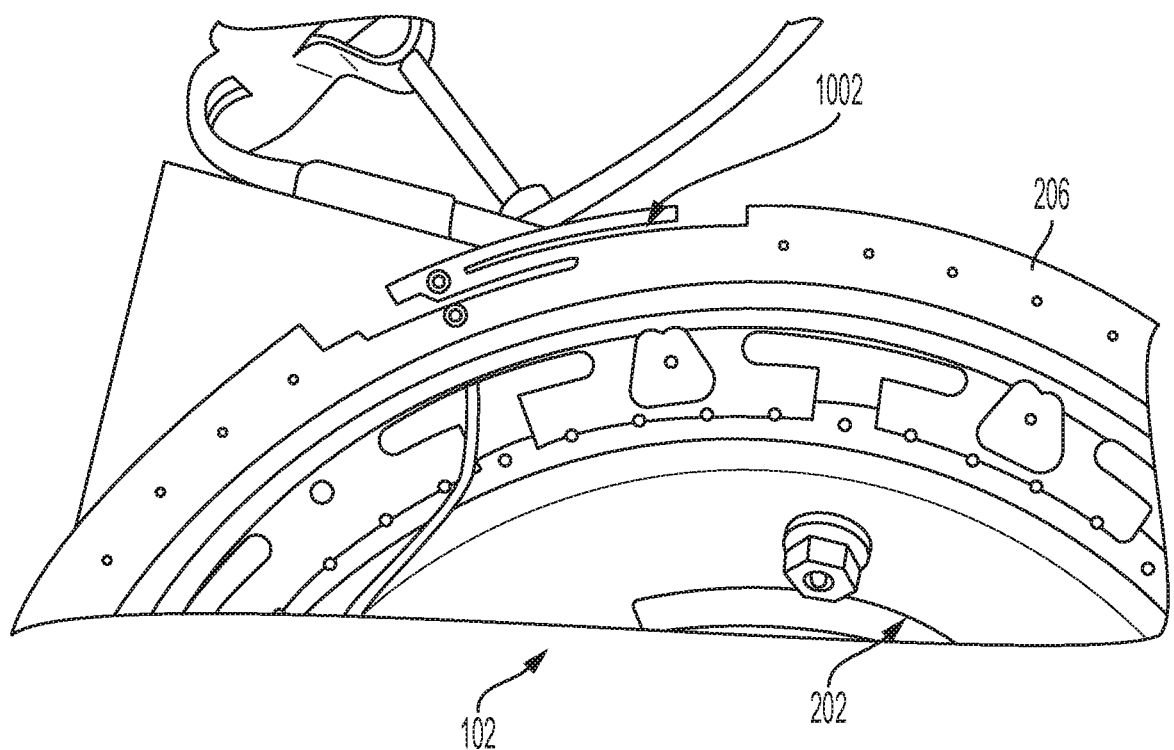
FIG. 10 depicts a portion of a housing of an intelligent luminaire of FIG. 1 including an integrated single-source, dual-band inverted F antenna, according to certain aspects of the present disclosure.
Figure 11:
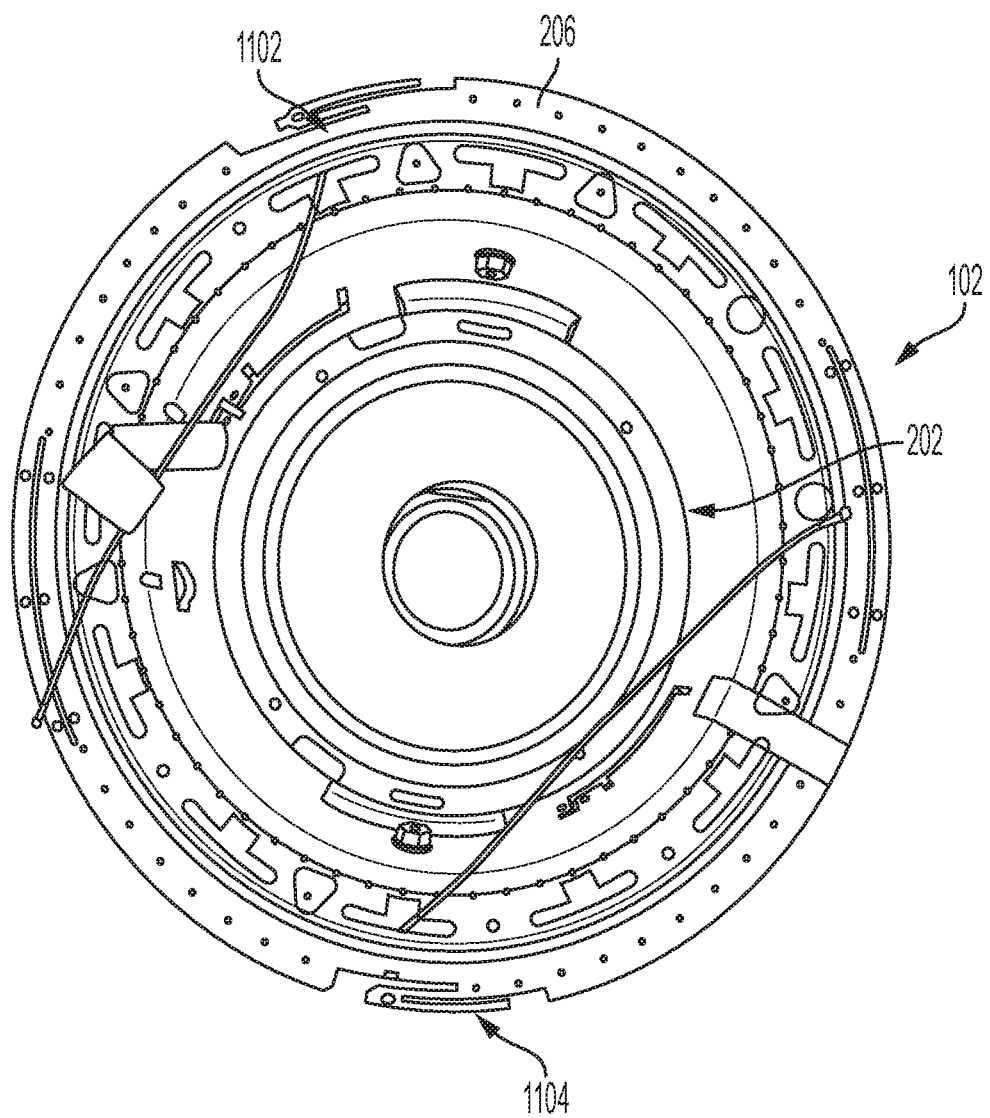
FIG. 11 depicts a portion of a housing of an intelligent luminaire of FIG. 1 including two integrated dual-source, dual-band inverted F antennas, according to certain aspects of the present disclosure.

FIG. 10 depicts a portion of a housing 202 of an intelligent luminaire 102 including an integrated single-source, dual-band inverted F antenna 1002. Instead of stamping the inverted F antenna and attaching it to a cut-out portion of the trim 206, the inverted F antenna 1002 is etched directly into metal of the trim 206. Similarly, FIG. 11 depicts a portion of a housing 202 of an intelligent luminaire 102 including two integrated dual-source, dual-band inverted F antennas 1102 and 1104, according to certain aspects of the present disclosure. The inverted F antennas 1102 and 1104 are also etched directly into the metal of the trim 206.

Figure 12:
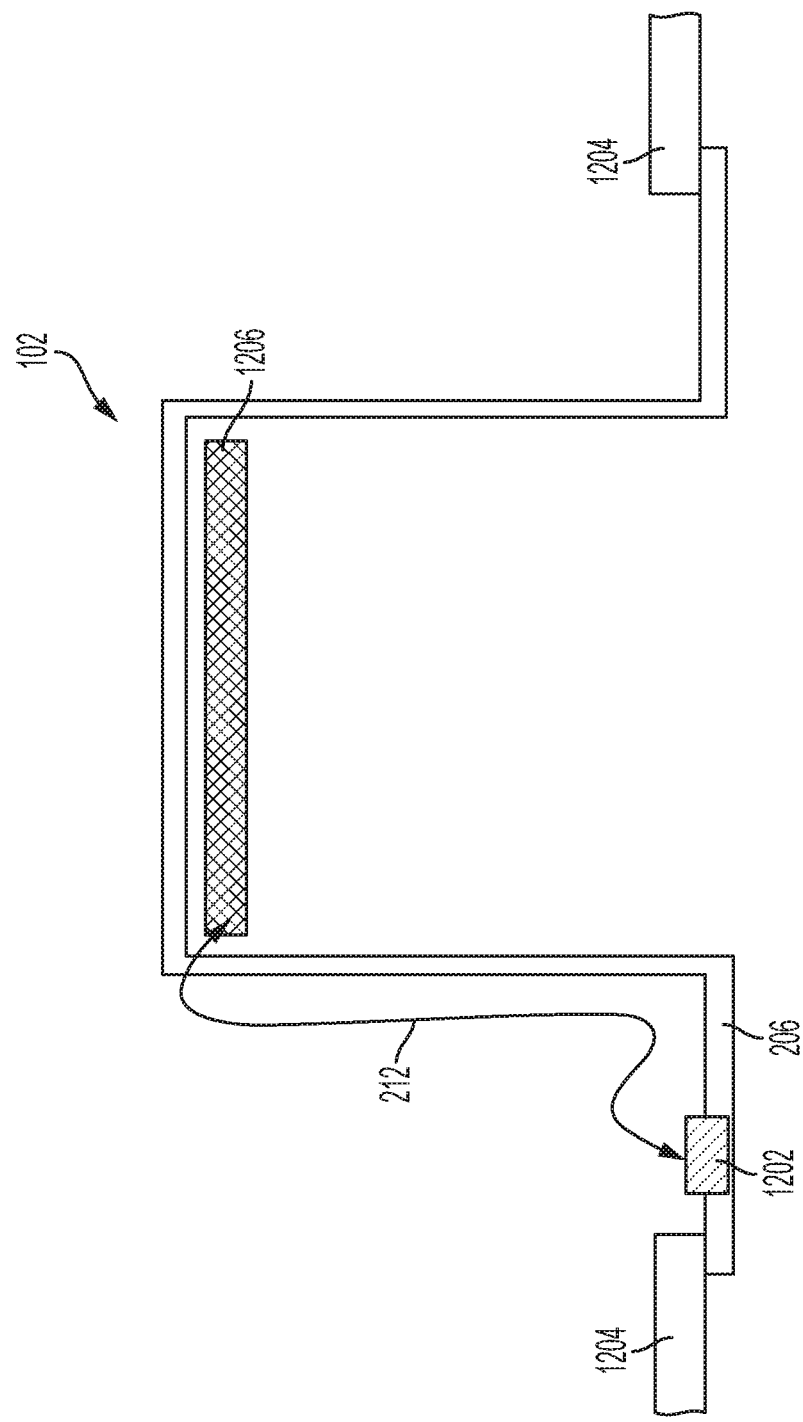
FIG. 12 depicts a schematic representation of an aperture antenna that is stamped or etched into trim of an intelligent luminaire of FIG. 1, according to certain aspects of the present disclosure.

FIG. 12 depicts a schematic representation of a slot antenna 1202 that is stamped or etched into the trim 206 of an intelligent luminaire 102. The slot antenna 1202 may be any of the slot antennas 202 or inverted F antennas 702, 802, 1002, 1102, or 1104 described above. As depicted, the trim 206 extends into a space on an opposite side of a ceiling 1204 from a remainder of the intelligent luminaire 102. The slot antenna 1202 may be cut out of the metallic trim 206 of the intelligent luminaire 102, or the slot antenna 1202 may include metal that is stamped onto the trim 206 of the intelligent luminaire 102. In an example, as shown in FIGS. 7 and 8 above, the antenna may be stamped onto a non-metallic material and attached to a cutout in the metallic trim 206 of the intelligent luminaire 102. Further, the coaxial cable 212 may provide energizing voltage to the slot antenna 1202 from a power source 1206 of the intelligent luminaire 102.

Figure 13:
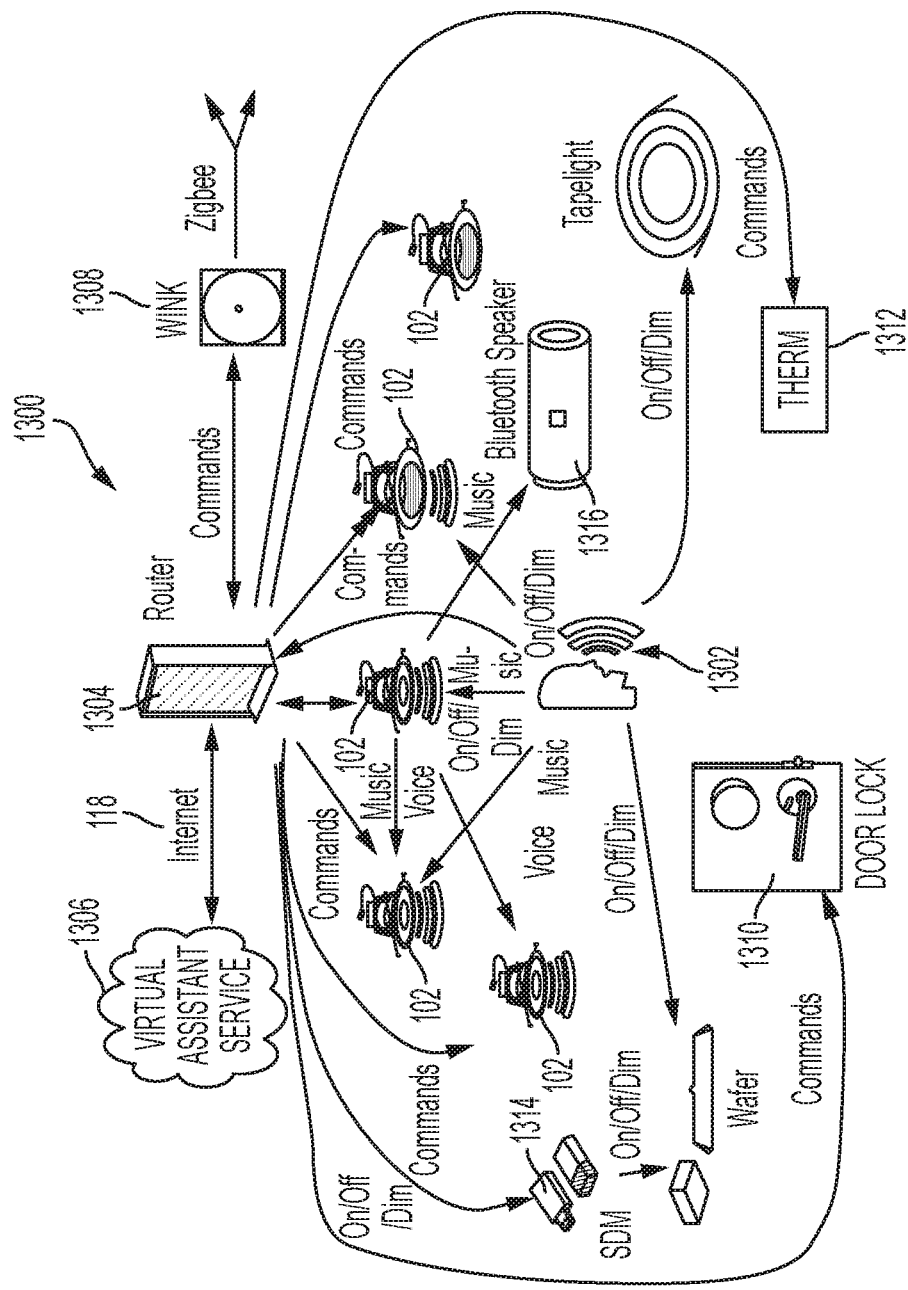
FIG. 13 depicts a diagram detailing wireless communications available between intelligent luminaires and other devices, according to certain aspects of the present disclosure.

FIG. 13 depicts a diagram 1300 detailing wireless communications available between intelligent luminaires 102 and other devices using the slot antenna 1202 within the intelligent luminaires 102. For example, the virtual assistant enabled intelligent luminaire 102 may have the ability to wirelessly communicate with a network of devices to stream media or other communications between devices using the slot antenna 1202 within the intelligent luminaire 102.

As an example, a voice command 1302 may be received at an intelligent luminaire 102 that includes a microphone 128. The intelligent luminaire 102 may provide a wireless data signal to a router 1304 using a slot antenna 1202 integrated with the intelligent luminaire 102. In an example, the slot antenna 1202 may communicate the voice command 1302 to the router 1304 using a WiFi frequency. The router 1304 may transmit the voice command 1302 from the intelligent luminaire 102 to a virtual assistant service 1306 (e.g., Alexa® by Amazon Technologies, Inc., Google Now and Google Assistant by Google LLC, Cortana® by Microsoft Corporation, Siri® by Apple Inc., any other virtual assistants) using the WAN 118. The virtual assistant service 1306 may return instructions to the router 1304 that are associated with the voice command 1302, and the router 1304 may communicate the instructions wirelessly to one or more intelligent luminaires 102 using slot antennas 1202 associated with the intelligent luminaires 102. The router 1302 may also communicate instructions associated with the voice command 1302 directly with a Wink hub 1308, a WiFi enabled door lock 1310, a WiFi enabled thermostat 1312, a smart bridge module 1314, or any other WiFi enabled devices. Further, the intelligent luminaires 102 may also communicate wirelessly with other devices (e.g., a Bluetooth speaker 1316) through the slot antenna 1202 communicating using a Bluetooth frequency.

Figure 14:
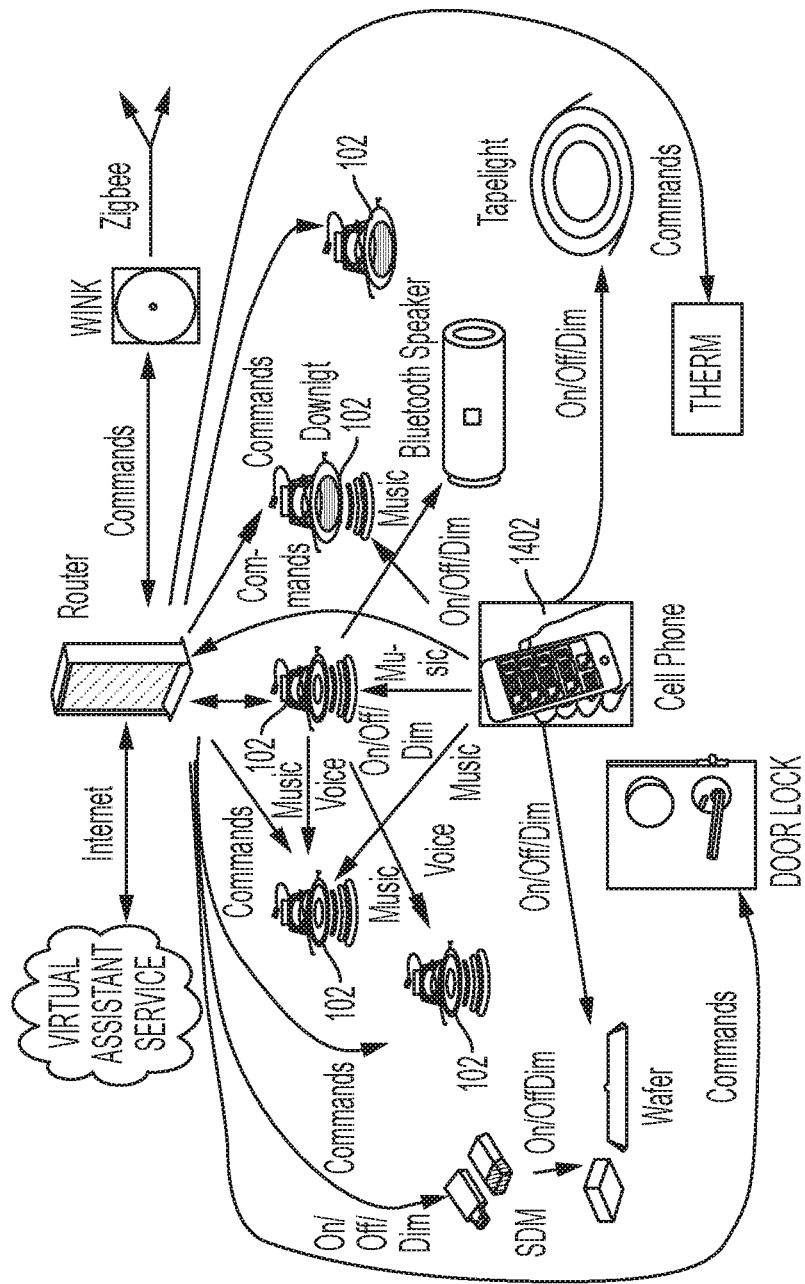
FIG. 14 depicts a diagram detailing additional wireless communications available between intelligent luminaires and other devices, according to certain aspects of the present disclosure.

Similarly, FIG. 14 depicts a diagram 1400 detailing additional wireless communications available between the intelligent luminaires 102 and other devices. For example, a user operating a cellular telephone 1402 may communicate with each of the intelligent luminaires 102 directly using mobile application control through the slot antenna 1202 of the intelligent luminaires 102 operating on a Bluetooth frequency. Any commands available at the virtual assistant enabled intelligent luminaire 102 may also be performed from the mobile device application. The intelligent luminaires 102 may use the slot antennas 1202 to communicate on one or more WiFi frequencies when the slot antenna 1202 is a dual-band antenna or when the intelligent luminaires 102 include multiple single-band antennas.

A communication protocol of the intelligent luminaire 102 may include Bluetooth, Wi-Fi, ZigBee (e.g., through the Wink hub 1308) or any other suitable wireless or wired communication protocols. The arrangement of the intelligent luminaire 102 may include a trim flange (e.g., the trim 206) with electronics that reside within the trim 206, inside or outside of a can of the intelligent luminaire 102, against a finished side of the ceiling 1204, or any combination thereof. An option exists to make the trim 206 modular, such that different internet of things (IoT) sensors can be easily interchanged. While the virtual assistant enabled intelligent luminaire 102 is described generally as a downlight luminaire, other luminaire types and form factors may also be used including wall sconces, surface mounted lighting, pendant mounted lighting, vanity lighting, undercabinet lighting, tape lighting, and track lighting.

In an example, the virtual assistant enabled intelligent luminaire 102 receives the voice command 1302 from an occupant of a room at the microphone 128 of the virtual assistant enabled intelligent luminaire 102. The virtual assistant luminaire provides the voice command to a voice assistant service cloud 1306 (e.g., Alexa, Google Now, Google Assistant, Cortana, Siri, etc.) using a communication protocol. The voice assistant service 1306 (i.e., a voice service) may provide commands to other devices (e.g., other lighting devices or other non-lighting "connected" devices) associated with the virtual assistant enabled intelligent luminaire 102 to perform functions related to the voice command 1302. Further, any devices capable of connecting with one of the voice assistant services 1306 may also be capable of receiving voice commands 1302 originating from the virtual assistant enabled intelligent luminaire 102.

When playing music across speakers of multiple intelligent luminaires 102, synching of the music may be performed across a Bluetooth link between the multiple luminaires. Synching the music at the luminaires 102 involves synching a timing of the audio output from each of the luminaires 102. Synching the timing of the audio output provides a uniform audio output across all of the luminaires 102 playing the music. In another example, synching the music between the multiple luminaires 102 may be performed using a Wi-Fi communication link between the multiple luminaires 102 and the wireless router 1304.

The virtual assistant enabled intelligent luminaire 102 may include multiple communication antennas, such as slot antennas 1202. For example, the multiple communication antennas may include a Wi-Fi antenna, a Bluetooth antenna, a cellular antenna, or any combination thereof. Each of the multiple antennas may provide an antenna for a different wireless communication protocol. Additionally, any kind of wireless communication protocol may be used in addition to Wi-Fi, Bluetooth, Zigbee, Z-Wave, Bluetooth Mesh, and cellular communication.

In an example, the virtual assistant enabled intelligent luminaire 102 may be communicatively coupled to multiple environmental sensors, such as the sensor 144 depicted in FIG. 1. The environmental sensors may be included within a housing of the virtual assistant enabled intelligent luminaire 102, or the environmental sensors may be wired or wirelessly connected to the virtual assistant enabled intelligent luminaire 102 from a remote location (e.g., across a room, on the wall, on the floor, etc.). The sensors may provide signals to a single-board computer (SBC) or other processing component of the virtual assistant enabled intelligent luminaire 102. At the SBC or other processing component, the signals received from the environmental sensor may be processed locally or provided via a communication link to the virtual assistant service 1306 (e.g., a processing component of one of the voice services described above) for processing remotely. The processed signals may provide an indication of an environmental state (e.g., brightness, room occupancy, gas concentration, etc.) of an area surrounding the environmental sensor.

The virtual assistant service 1306 may control an output of the virtual assistant enabled intelligent luminaire 102 based on the environmental state. For example, the virtual assistant service 1306 may increase a brightness of the luminaire when an environmental sensor detects a decrease in a brightness level of a room. In other examples, the virtual assistant service 1306 may control the luminaire to output a warning using non-verbal communication (e.g., turn the light red, control the light to flash on and off, etc.) when the environmental sensor detects an unsafe concentration of a specific gas surrounding the environmental sensor. Other non-verbal communication to indicate other events are also contemplated.

Figure 15:
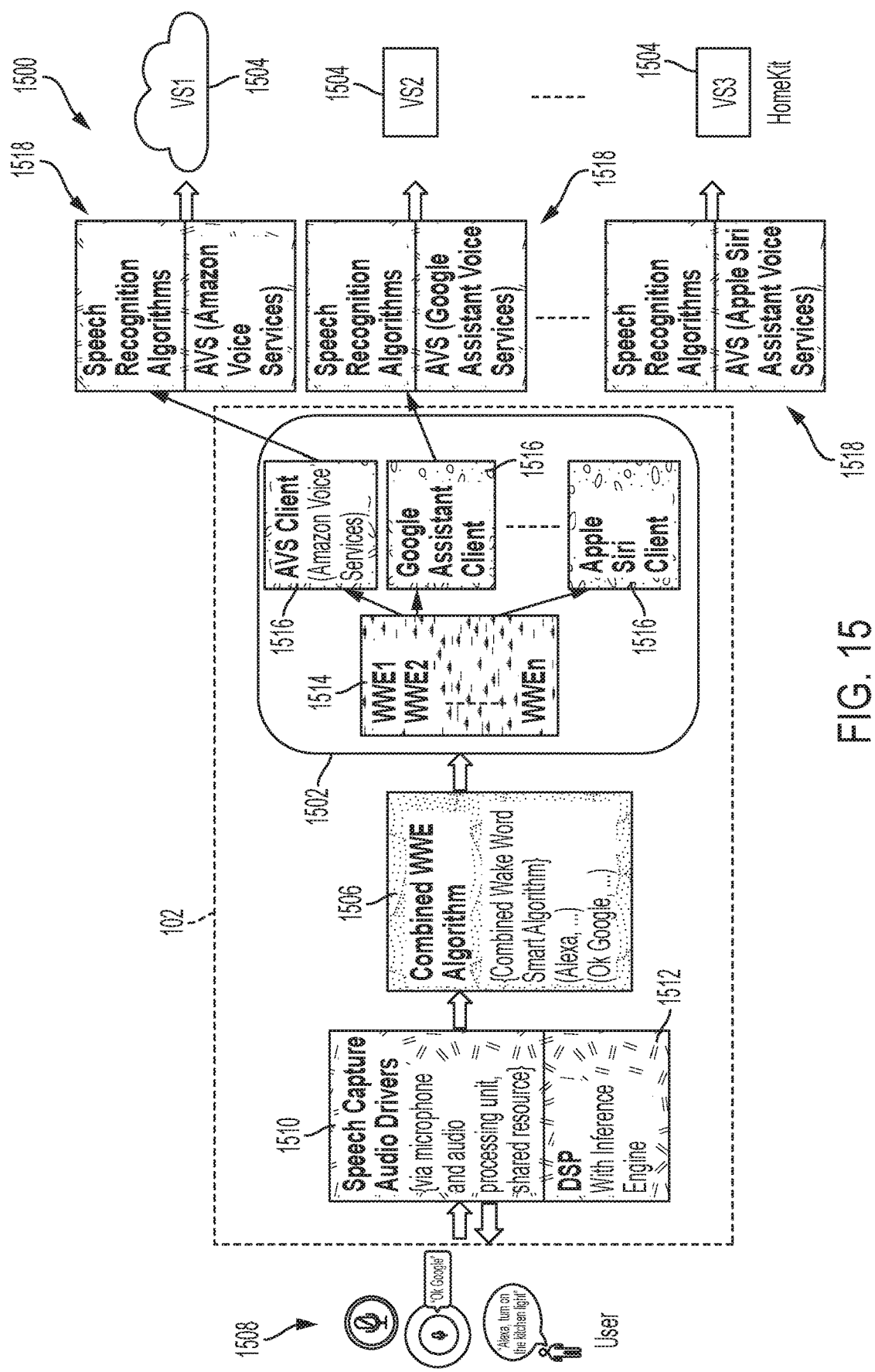
FIG. 15 depicts a diagram detailing operation of a universal voice assistant through an intelligent luminaire of FIG. 1, according to certain aspects of the present disclosure.

FIG. 15 depicts a diagram 1500 detailing operation of a universal voice assistant 1502 through an intelligent luminaire 102. To support multiple voice services within a user's environment (e.g., at home or work), a user may acquire multiple different devices that are each leveraged toward individual voice services 1504 such as Alexa, Google Now or Google Assistant, Cortana, Siri, etc. A universal smart fixture, such as a voice assistant enabled intelligent luminaire 102, may be a network connected light fixture capable of detecting a voice interface with which a user initiated command is trying to communicate. For example, the universal smart fixture is compatible with all voice initiated interfaces, and the universal smart fixture is able to differentiate between the intended voice interface based on audible commands received from a user.

In one or more examples, the universal smart fixture includes hardware and software systems and methods, such as the universal voice assistant 1502, to detect a wake word or other trigger from various voice interfaces (e.g., the microphones 128) and route the audible user command to a data cloud path for the specific wake word used by a user. The universal smart fixture may also include a combined wake word engine 1506 that reacts to any wake word initiated by the user to activate a voice service. In an example, a system may include an individual smart fixture and several additional satellite units capable of detecting audible commands and streaming the detected audible commands to the individual smart fixture for further processing. The universal smart fixture and any satellite units may also be compatible with other voice activated devices (e.g., mobile phones, Amazon Echo, Google Home, etc.). Further, the other voice activated devices, such as the mobile phones, may include mobile applications that provide mechanisms to control the universal smart fixture. In one example, the mobile applications provide a mechanism to mute microphones associated with the universal smart fixture and any satellite units for privacy.

The diagram 1500 provides an indication of an architecture of the universal smart fixture (e.g., the intelligent luminaire 102). In an example, the architecture of the universal smart fixture relies on sharing hardware resources. For example, the architecture of the universal smart fixture shares hardware at an audio front end 1508 and at a transmitter audio path (i.e., a speaker output path). The architecture of the universal smart fixture also incorporates multiple wake word engines (WWE1-WWEn) (e.g., the combined wake word engine 1506), and the architecture includes a smart algorithm within the combined wake word engine 1506 that distinguishes which wake word was initiated by a user input. Upon distinguishing the wake word at the combined wake word engine 1506, the architecture defines, at the universal voice assistant 1502, which voice service is most appropriate for the responding to the user command.

A speech capture audio drivers block 1510 facilitates capture of a user voice in near or far field (e.g., at the intelligent luminaire 102 or at a remote device). The speech capture audio drivers block 1510 also processes the audio and digitizes the processed audio for signal processing and filtering of signal noise, feedback echo, or any other background noise.

A digital signal processor (DSP) block 1512 with an interference engine is a digital audio signal processing unit. The DSP block 1512 has an incorporated interference engine that predicts, learns, and verifies a specific user's voice. By predicting and learning the user's voice, the DSP block 1512 is able to detect and verify individual users and to distinguish between noise and user voices that have been verified.

The combined wake word engine (WWE) algorithm block 1506 provides a combination of various wake word engine algorithms that will receive the cleaned up and verified voice commands and process and route a user wake word from the voice commands to an appropriate WWE block 1514 (e.g., WWE1 to WWEn). In an example, the architecture may include a single-board computer (SBC), and the SBC may include one or more processors to operate the one or more compatible voice services. Further, the combined WWE algorithm block 1506 may also be linked to a physical button that ties into specific hardware associated with a specific compatible voice service. For example, a wall switch accessory or a mobile application may include one or more physical buttons associated with one or more specific voice services. Pressing the physical button for a specific voice service automatically sends a voice command to the appropriate voice service without a wake word. Voice service clients 1516 are able to connect the WWE block 1514 to third party voice services software development kits (SDKs) 1518. From the SDKs 1518, the architecture is able to provide the voice command to clouds of the voice service providers 1504.

Further, in one or more examples, the architecture may enable querying of multiple different voice services 1504. For example, when a user uses a generic wake word not assigned to a particular voice service 1504, the architecture may query all of the available voice services 1504 for an answer to a question or to control the luminaire. When a user provides some voice commands or questions to the intelligent luminaire 102, not all of the voice services 1504 will be capable of performing the function or answering the question. Accordingly, the architecture provides the voice command or question to the voice service 1504, and the architecture may provide one or more of the resulting controls or answers to the intelligent luminaire 102 for distribution to the user.

Figure 16:
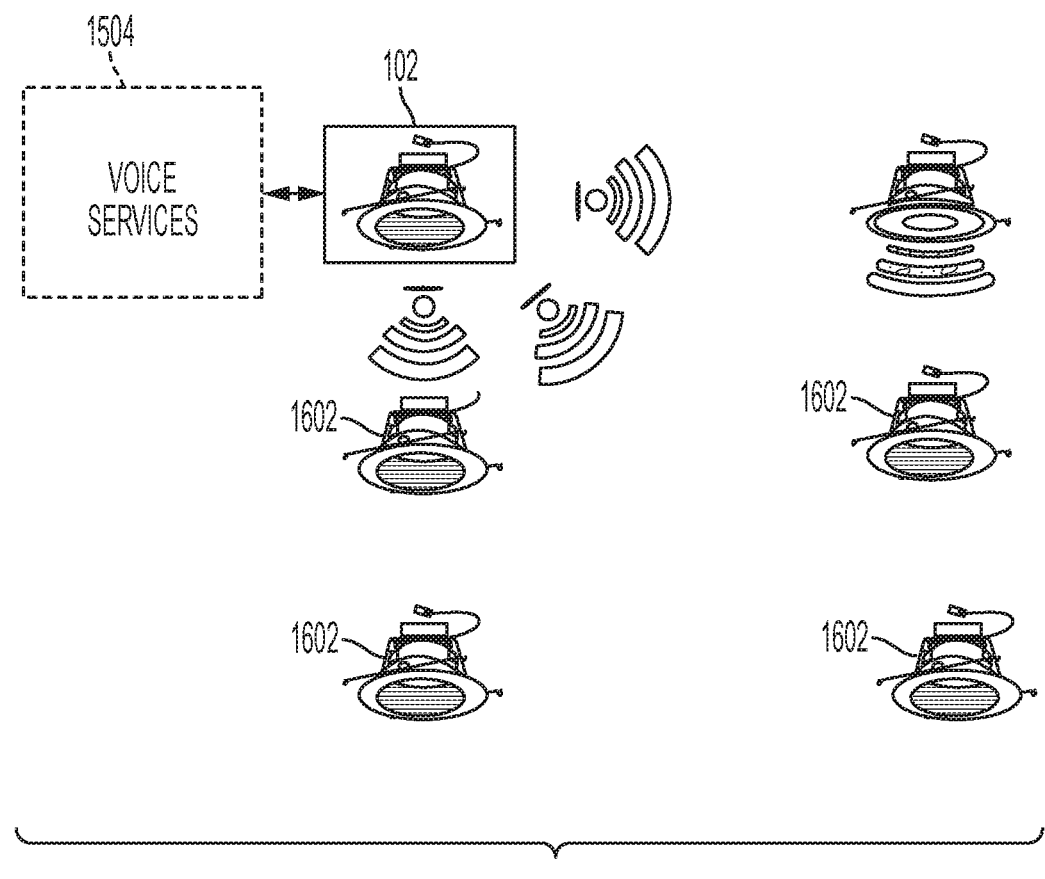
FIG. 16 depicts a diagram of an intelligent luminaire of FIG. 1 interacting with several satellite fixtures, according to certain aspects of the present disclosure.

FIG. 16 depicts an diagram of an intelligent luminaire 102 interacting with several satellite fixtures 1602. A universal smart fixture, which may be a virtual assistant enabled intelligent luminaire 102, may be universally compatible with several different voice services 1504, as described above with respect to FIG. 15. The universal smart fixture is able to leverage a universal voice service compatibility to provide control to the satellite fixtures 1602. In an example, the satellite fixtures 1602 may be non-universal (i.e., not capable of interacting with each of the voice services 1504). Further, the satellite fixtures 1602 may include intelligent luminaires 102 with integrated speakers, the satellite fixtures 1602 may be wireless compatible downlights without speakers, or the satellite fixtures 1602 may be any combination thereof.

FIG. 17 depicts a diagram of a group of compatible connected fixtures 1702 (e.g., intelligent luminaires 102) interacting with multiple different voice services 1504. The universal connected fixtures 1702, which may be virtual assistant enabled luminaires with or without speaker functionality, are universally compatible with several different voice services 1504, as described above with respect to FIG. 15. The universal connected fixtures 1702a are able to leverage their universal voice service compatibility to interact with multiple different voice service devices 1704 and 1706. In an example, one or more connected fixtures 1702b may be non-universal. In such an example, the non-universal connected fixtures may interact with the different voice services by transmitting information to and receiving information from the universal connected fixtures 1702a as endpoints capable of interacting with the voice services 1704 and 1706.

FIG. 18 depicts a diagram of an additional group of compatible connected fixtures 1802 interacting with multiple different voice services 1504. The illustrated universal connected fixtures 1802, which may be virtual assistant enabled luminaires without speaker functionality, are universally compatible with several different voice services 1504, as described above with respect to FIG. 15. The universal connected fixtures 1802 are able to leverage their universal voice service compatibility to interact with multiple different voice service devices 1804 and 1806. In an example, the universal connected fixtures 1802 rely on a voice service device 1804 or 1806 as an endpoint capable of interacting with the voice services 1504. For example, the universal connected fixtures 1802 may rely on the audible communication capabilities of the voice service devices 1804 and 1806 to provide audible communication to a user. In such an example, the universal connected fixtures 1802 may be IoT devices without speakers.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Aspects of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific aspects thereof, it will be appreciated that those skilled in the art, upon attaining an understanding of the foregoing, may readily produce alterations to, variations of, and equivalents to such aspects. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A luminaire, comprising:
   a light source positioned at a first level within a luminaire housing;
   a trim component positioned at a second level of the luminaire housing different from the first level, wherein the trim component extends into a room from a ceiling surface and comprises an aperture antenna configured to receive wireless signals and to transmit wireless signals; and
   a communication module configured to communicate wirelessly with one or more devices remote from the luminaire by controlling excitation of the aperture antenna; and a light guide positioned within the aperture antenna and configured to provide a visual feedback response to an occupant of a room illuminated by the luminaire.

2. The luminaire of claim 1, wherein the aperture antenna comprises a single-feed, dual-band aperture antenna.

3. The luminaire of claim 1, wherein the aperture antenna comprises:
an aperture etched in the trim component; and
a plastic fill within the aperture, wherein the plastic fill is configured to match an appearance of a remainder of the trim component.

4. The luminaire of claim 1, wherein the aperture antenna is configured to communicate with WiFi and Bluetooth communication standards simultaneously.

5. The luminaire of claim 1, wherein the aperture antenna comprises an inverted F antenna.

6. The luminaire of claim 5, wherein the inverted F antenna comprises a single-feed, dual-band inverted F antenna.

7. The luminaire of claim 5, wherein the inverted F antenna is etched into the trim component, or wherein the inverted F antenna is stamped into a separate component and the separate component is coupled to the trim component.

8. The luminaire of claim 1, wherein the aperture antenna is configured to (i) transmit voice data to a voice activated control system and (ii) receive control signals from the voice activated control system corresponding to the voice data.

9. A lighting system, comprising:
a first luminaire comprising:
a first light source positioned at a first level within a first luminaire housing;
a first trim component positioned at a second level within the first luminaire housing, wherein the second level is different from the first level, and wherein the first trim component comprises a first aperture antenna configured to receive wireless signals and to transmit wireless signals;
a first communication module configured to communicate wirelessly with one or more devices remote from the first luminaire by controlling excitation of the first aperture antenna;
a visual feedback slot positioned within the first trim component; and
a light guide element positioned within the visual feedback slot, wherein the light guide element is configured to (i) receive a light output from a second light source and (ii) provide visual communication signals based on the light output from the second light source to occupants of a room, and wherein the first aperture antenna comprises the visual feedback slot; and
a second luminaire configured to communicate wirelessly with the first luminaire across the first aperture antenna of the first luminaire.

10. The lighting system of claim 9, wherein the second luminaire comprises:
a second aperture antenna; and
a second communication module configured to communicate wirelessly with the first luminaire by controlling excitation of the second aperture antenna.

11. The lighting system of claim 9, wherein the first aperture antenna comprises a pair of single-source, single-band aperture antennas.

12. The lighting system of claim 9, wherein the first aperture antenna comprises a single-feed, dual-band inverted F antenna.

13. The lighting system of claim 12, wherein the single-feed, dual-band inverted F antenna is configured to communicate using a WiFi and Bluetooth communication standard simultaneously.

14. The lighting system of claim 9, wherein the first aperture antenna is configured to (i) transmit voice data from the first luminaire, the second luminaire, or both to a voice activated control system and (ii) receive control signals from the voice activated control system corresponding to the voice data.

15. A luminaire, comprising:
a light source configured to illuminate an area surrounding the luminaire;
a trim component comprising an aperture antenna that is configured to receive wireless signals and to transmit wireless signals, wherein the aperture antenna comprises:
a first edge; and
a second edge opposite the first edge;
a coaxial cable configured to provide an alternating current (AC) voltage source to the aperture antenna, the coaxial cable comprising:
a first conductor coupled to the first edge of the aperture antenna; and
a second conductor coupled to the second edge of the aperture antenna;
a communication module configured to communicate wirelessly with one or more devices remote from the luminaire by controlling excitation of the aperture antenna using the coaxial cable; and
a light guide positioned within the aperture antenna and configured to provide a visual feedback response to an occupant of a room illuminated by the luminaire.

16. The luminaire of claim 15, wherein the aperture antenna further comprises:
a third edge that is parallel to the first edge and the second edge, wherein a distance between the second edge and the third edge is smaller than a distance between the first edge and the second edge.

17. The luminaire of claim 15, wherein the aperture antenna comprises a single-feed, dual-band aperture antenna.

18. The luminaire of claim 15, wherein the trim component further comprises a second aperture antenna, and wherein the luminaire further comprises a second coaxial cable configured to provide a second alternating current (AC) voltage source to the second aperture antenna.

* * * * *